United States Patent
Fang et al.

(10) Patent No.: US 12,448,378 B2
(45) Date of Patent: Oct. 21, 2025

(54) FLUOROPYRROLOPYRIDINE COMPOUND AND APPLICATION THEREOF

(71) Applicant: Wuxi Life Fountain Biotech Co., Ltd, Jiangsu (CN)

(72) Inventors: Kun Fang, Shanghai (CN); Shuhui Chen, Shanghai (CN)

(73) Assignee: Wuxi Life Fountain Biotech Co., Ltd, Wuxi (CN)

( * ) Notice: Subject to any disclaimer, the term of this patent is extended or adjusted under 35 U.S.C. 154(b) by 528 days.

(21) Appl. No.: 17/928,295

(22) PCT Filed: May 26, 2021

(86) PCT No.: PCT/CN2021/096143
§ 371 (c)(1),
(2) Date: Nov. 29, 2022

(87) PCT Pub. No.: WO2021/238999
PCT Pub. Date: Dec. 2, 2021

(65) Prior Publication Data
US 2023/0212165 A1    Jul. 6, 2023

(30) Foreign Application Priority Data

May 29, 2020 (CN) .......................... 202010478432.9
Feb. 1, 2021 (CN) .......................... 202110139687.7

(51) Int. Cl.
C07D 471/04 (2006.01)
A61P 35/00 (2006.01)

(52) U.S. Cl.
CPC ............ C07D 471/04 (2013.01); A61P 35/00 (2018.01)

(58) Field of Classification Search
CPC .................................................... C07D 471/04
USPC ........................................................ 514/300
See application file for complete search history.

(56) References Cited

U.S. PATENT DOCUMENTS

2020/0399260 A1    12/2020  Qian et al.

FOREIGN PATENT DOCUMENTS

| WO | 2011154737 A1 | 12/2011 |
| WO | 2019014618 A1 | 1/2019 |
| WO | 2019036641 A1 | 2/2019 |
| WO | 2019050889 A1 | 3/2019 |
| WO | 2019154365 A1 | 8/2019 |

OTHER PUBLICATIONS

Sep. 1, 2021 International Search Report issued in International Patent Application No. PCT/CN2021/096143.
Sep. 1, 2021 Written Opinion of the International Searching Authority issued in International Patent Application No. PCT/CN2021/096143.
First Office Action issued in the Counterpart Chinese Patent Application No. 202180037895.4 dated Oct. 20, 2023.
Search Report issued in the Counterpart Chinese Patent Application No. 202180037895.4 dated Oct. 16, 2023.
May 17, 2024 The extended European search report issued in European Patent Application No. 21813936.8.

*Primary Examiner* — Taofiq A Solola

(57) ABSTRACT

Disclosed is a fluoropyrrolopyridine compound, and specifically disclosed is a compound represented by formula (II), an isomer or a pharmaceutically acceptable salt thereof.

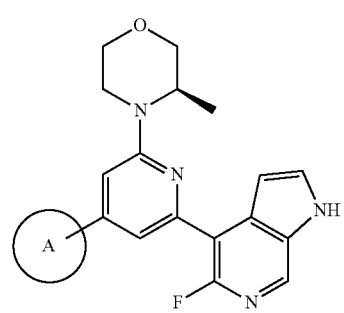

(II)

12 Claims, No Drawings

FLUOROPYRROLOPYRIDINE COMPOUND AND APPLICATION THEREOF

CROSS-REFERENCES TO RELATED APPLICATIONS

The present application is a National Stage of International Application No. PCT/CN2021/096143, filed on May 26, 2021, which claims the priorities of Chinese patent application CN202010478432.9 filed on May 29, 2020 and Chinese patent application CN202110139687.7 filed on Feb. 1, 2021. The contents of the above Chinese patent applications are incorporated herein by reference in its entireties.

TECHNICAL FIELD

The present disclosure relates to a class of fluoropyrrolopyridine compounds, and specifically to a compound represented by formula (II), an isomer thereof or a pharmaceutically acceptable salt thereof.

BACKGROUND

DNA damage response (DDR) ensures the genome integrity of living cells by diverse signaling pathways. Intracellular proteins directly recognize abnormal DNA structures and activate related kinases of DDR pathway in response to extensive DNA damage and increased replication stress within cancer cells. The DDR pathway enables cells to survive in the face of genomic instability and replication stress, or mediate irreparable damage, cellular senescence or programmed death. Defects in DDR genes promote driver gene variation, tumor heterogeneity, and evasion of apoptosis through multiple ways, so as to promote tumor growth.

ATR (ataxia telangiectasia and RAD-3-related protein kinase) belongs to the PIKKs (phosphatidylinositol-3-kinase-related kinase) family and is involved in DNA damage repair to maintain gene stability. ATR protein kinase produces a synergistic response to DNA damage, replication stress and cell cycle disturbance. ATR and ATM belong to the PIKK family of serine/threonine protein kinases, and they are common components of cell cycle and DNA damage repair. Others include Chk1, BRCA1, and p53. ATR is mainly responsible for the repair of DNA replication stress (replication fork stalling) and single-strand breakages.

ATR is activated by DNA single-strand structures when DNA double-strand breaks appear to be excised or replication forks are stalled. DNA polymerase stays in the DNA replication process, and the replication helicase continues to unwind at the front end of the DNA replication fork, resulting in the production of long single-strand DNA (ssDNA), which is then bound by the single-strand DNA and RPA (replication protein A). When replication stress or DNA damage occurs, the complex of ATR/ATR-acting proteins recruited by RPA bind to the injury site, and the RPA-single-strand DNA complex activates the RAD17/rfc2-5 complex to bind to the injury site. The DNA-ssDNA junction activates the Rad9-HUS1-RAD1 (9-1-1) heterotrimer, and 9-1-1 in turn recruits TopBP1 to activate ATR. Once ATR is activated, ATR promotes DNA repair, stabilization and restart of stalled replication forks and transient cell cycle arrest through downstream targets. These functions are achieved by ATR by mediating the downstream target Chk1. ATR functions as a DNA damage cell cycle checkpoint in S phase. It can mediate the degradation of CDC25A through Chk1, thereby delaying the process of DNA replication and providing time for the repair of replication forks. ATR is also a master regulator of the G2/M cell cycle checkpoint, preventing premature entry of cells into mitosis until DNA replication is completed or DNA damage occurs. This ATR-dependent G2/M cell cycle arrest is mainly mediated by two mechanisms: 1. degradation of CDC25A. 2. Cdc25C is phosphorylated by Chk1 to bind to the 14-3-protein. The binding of Cdc25C to the 14-3-3 protein promotes its output from the nucleus and cytoplasmic isolation, thereby inhibiting its ability to dephosphorylate and activate nuclear Cdc2, which in turn prevents it from entering mitosis.

ATM gene often mutates in tumor cells, which indicates that the loss of ATM activity is beneficial to the survival of cancer cells. ATM kinase inactivation makes cells more dependent on ATR-mediated signaling pathways, and combined inactivation of ATR and ATM can induce synthetic lethality in cancer cells. Therefore, inhibiting ATR can be an effective method in future cancer treatments.

CONTENT OF THE PRESENT INVENTION

The present disclosure provides a compound represented by formula (II) or a pharmaceutically acceptable salt thereof,

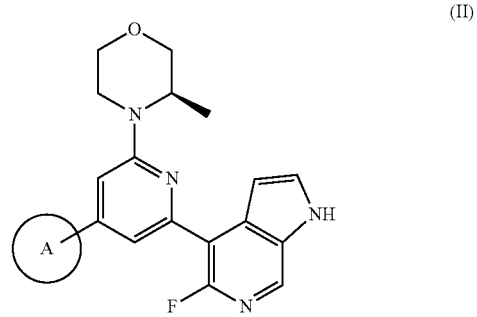

(II)

wherein,
ring A is

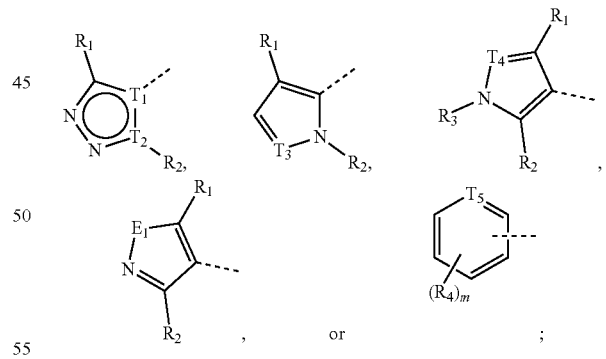

$T_1$, $T_2$, $T_3$, $T_4$ and $T_5$ are each independently C, CH or N;
$E_1$ is O or S;
$R_1$ is each independently H or $C_{1-3}$ alkyl, wherein the $C_{1-3}$ alkyl is optionally substituted with 1, 2 or 3 $R_a$;
$R_2$ is each independently H or $C_{1-3}$ alkyl, wherein the $C_{1-3}$ alkyl is optionally substituted with 1, 2 or 3 $R_b$;
$R_3$ is H or $C_{1-3}$ alkyl;
$R_4$ is each independently H, $C_{1-3}$ alkyl, —O—$C_{1-3}$ alkyl or —S(O)$_2$—$C_{1-3}$ alkyl, wherein the $C_{1-3}$ alkyl, —O—$C_{1-3}$ alkyl and —S(O)$_2$—$C_{1-3}$ alkyl are each independently optionally substituted with 1, 2 or 3 $R_c$;

$R_a$, $R_b$ and $R_c$ are each independently F, Cl, Br or I;
m is 1, 2 or 3.

The present disclosure provides a compound represented by formula (I) or a pharmaceutically acceptable salt thereof,

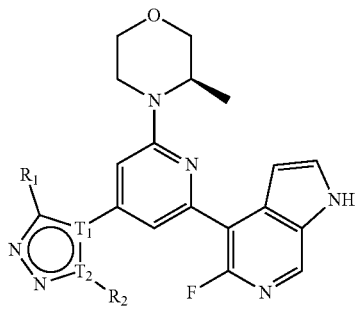

(I)

the structural moiety

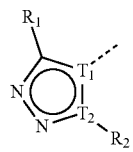

is

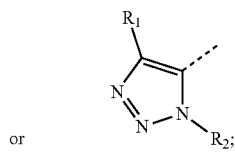

$R_1$ is each independently H or $C_{1-3}$ alkyl, wherein the $C_{1-3}$ alkyl is optionally substituted with 1, 2 or 3 $R_a$;

$R_2$ is each independently H or $C_{1-3}$ alkyl, wherein the $C_{1-3}$ alkyl is optionally substituted with 1, 2 or 3 $R_b$;

$R_a$ and $R_b$ are each independently F, Cl, Br or I.

In some embodiments of the present disclosure, the $R_1$ is H or $CH_3$, wherein the $CH_3$ is optionally substituted with 1, 2 or 3 $R_a$, and other variables are as defined in the present disclosure.

In some embodiments of the present disclosure, the $R_1$ is $CH_3$, and other variables are as defined in the present disclosure.

In some embodiments of the present disclosure, the $R_1$ is H or $CH_3$, and other variables are as defined in the present disclosure.

In some embodiments of the present disclosure, the $R_2$ is H or $CH_3$, wherein the $CH_3$ is optionally substituted with 1, 2 or 3 $R_b$, and other variables are as defined in the present disclosure.

In some embodiments of the present disclosure, the $R_2$ is $CH_3$, and other variables are as defined in the present disclosure.

In some embodiments of the present disclosure, the $R_2$ is H or $CH_3$, and other variables are as defined in the present disclosure.

In some embodiments of the present disclosure, the $R_3$ is each independently H or $CH_3$, and other variables are as defined in the present disclosure.

In some embodiments of the present disclosure, the $R_4$ is each independently H, $CH_3$, —O—$CH_3$ or —S(O)$_2$—$CH_3$, and other variables are as defined in the present disclosure.

In some embodiments of the present disclosure, the ring A is

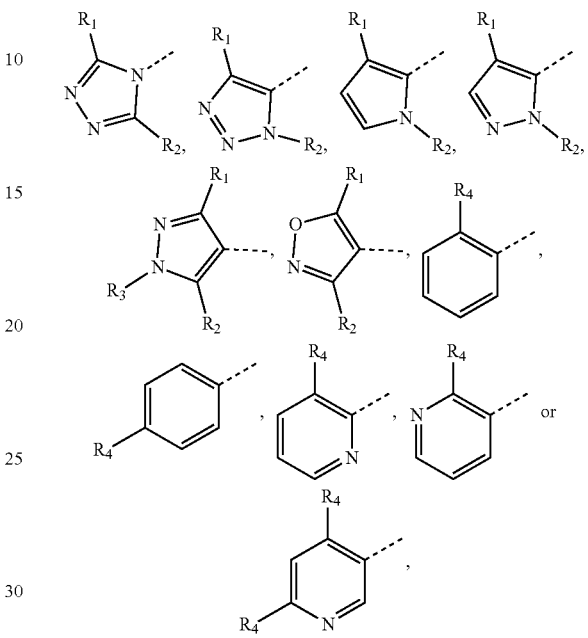

and other variables are as defined in the present disclosure.

In some embodiments of the resent disclosure the ring A is

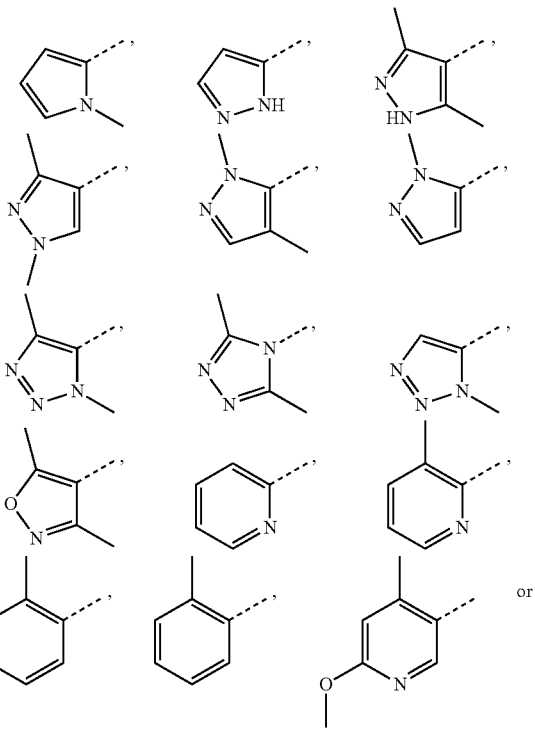

-continued

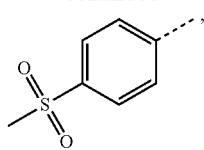

and other variables are as defined in the present disclosure.

In some embodiments of the present disclosure, the compound has the structure of formula (I-1) or (I-2)

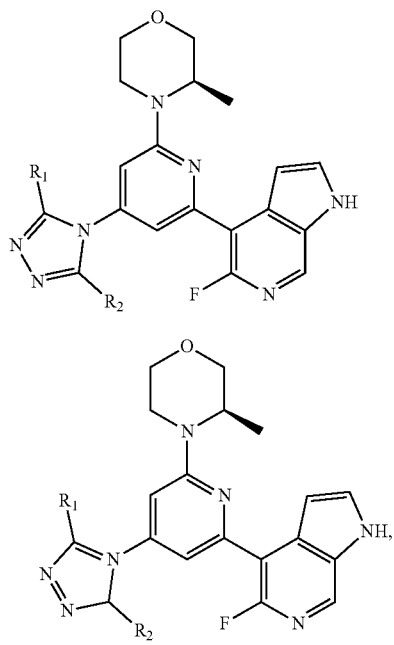

(I-1)

(I-2)

wherein, $R_1$ and $R_2$ are as defined in the present disclosure.

In some embodiments of the present disclosure, the structural moiety

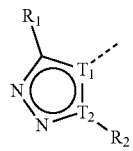

is

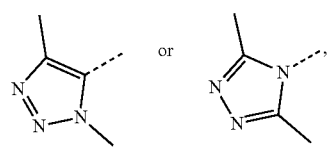

and the other variables are as defined in the present disclosure.

Other embodiments of the present disclosure are derived from any combination of above variables.

The present disclosure also provides a compound represented by the following formula or a pharmaceutically acceptable salt thereof,

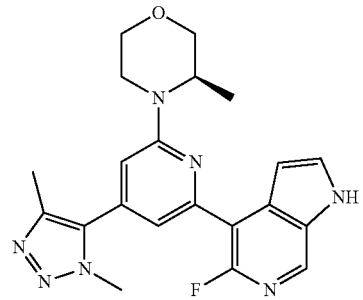

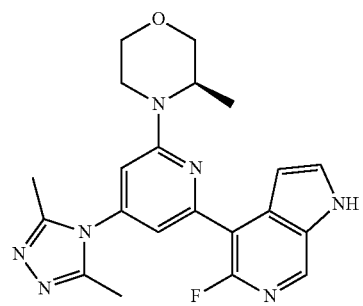 [SMILES: Cc1noc(C)c1-c1cc(-c2c(F)ncc3[nH]ccc23)nc(N2CCOC[C@H]2C)c1]

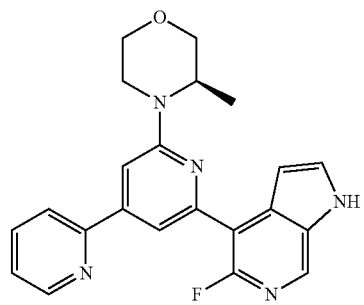

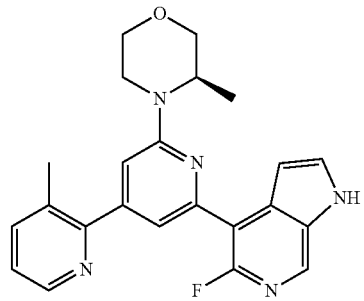

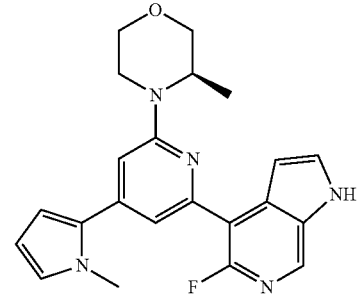

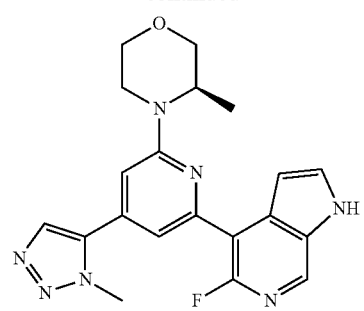
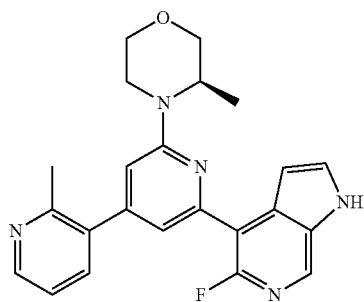
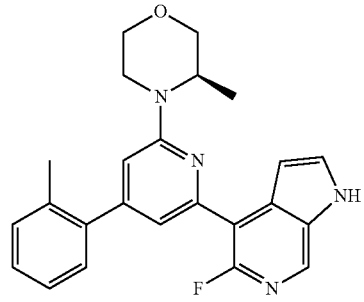
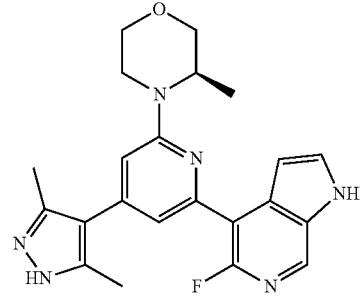
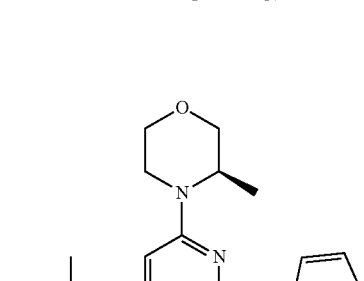
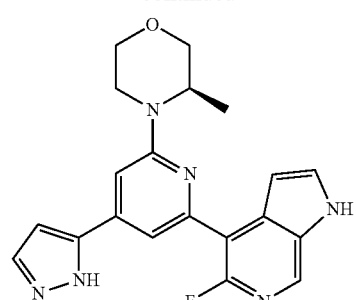
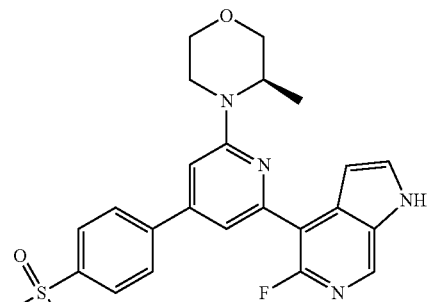
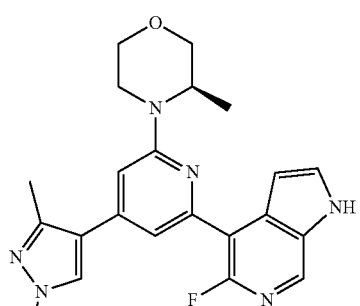
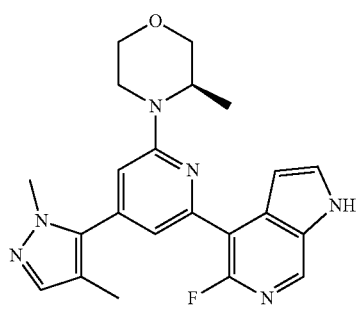
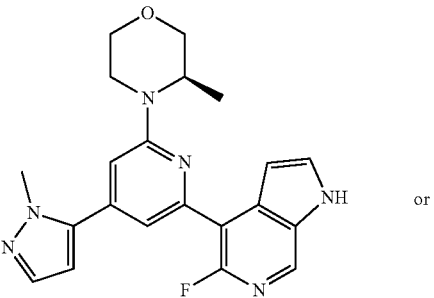 or -continued

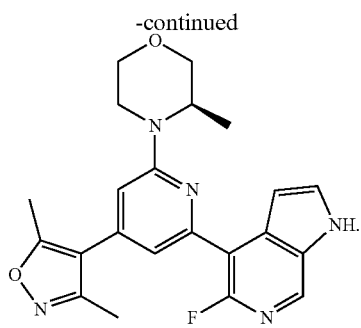

The present disclosure also provides a use of the compound or the pharmaceutically acceptable salt thereof in the manufacture of a medicament for the treatment of ATR-related diseases.

TECHNICAL EFFECT

The compounds of the present disclosure have strong inhibitory activity against ATR enzyme; at the same time, they have a good inhibitory effect on LoVo tumor cells lacking the ATM signaling pathway; at the same time, the compounds of the present disclosure have good PK parameters such as exposure and bioavailability, and are suitable for medication; in addition, the compounds of the present disclosure can significantly inhibit the growth of human gastric cancer SNU-601 xenograft tumor, and are relatively tolerated to mice.

Definition and Description

Unless otherwise specified, the following terms and phrases when used herein have the following meanings. A specific term or phrase should not be considered indefinite or unclear in the absence of a particular definition, but should be understood in the ordinary sense. When a trade name appears herein, it is intended to refer to its corresponding commodity or active ingredient thereof.

The term "pharmaceutically acceptable" is used herein in terms of those compounds, materials, compositions, and/or dosage forms, which are suitable for use in contact with human and animal tissues within the scope of reliable medical judgment, with no excessive toxicity, irritation, an allergic reaction or other problems or complications, commensurate with a reasonable benefit/risk ratio.

The term "pharmaceutically acceptable salt" refers to a salt of the compound of the present disclosure that is prepared by reacting the compound having a specific substituent of the present disclosure with a relatively non-toxic acid or base. When the compound of the present disclosure contains a relatively acidic functional group, a base addition salt can be obtained by bringing the compound into contact with a sufficient amount of base in a pure solution or a suitable inert solvent. The pharmaceutically acceptable base addition salt includes a salt of sodium, potassium, calcium, ammonium, organic amine or magnesium, or similar salts. When the compound of the present disclosure contains a relatively basic functional group, an acid addition salt can be obtained by bringing the compound into contact with a sufficient amount of acid in a pure solution or a suitable inert solvent. Examples of the pharmaceutically acceptable acid addition salt include an inorganic acid salt, wherein the inorganic acid includes, for example, hydrochloric acid, hydrobromic acid, nitric acid, carbonic acid, bicarbonate, phosphoric acid, monohydrogen phosphate, dihydrogen phosphate, sulfuric acid, hydrogen sulfate, hydroiodic acid, phosphorous acid, and the like; and an organic acid salt, wherein the organic acid includes, for example, acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, tartaric acid, and methanesulfonic acid, and the like; and salts of amino acid (such as arginine and the like), and a salt of an organic acid such as glucuronic acid and the like. Certain specific compounds of the present disclosure contain both basic and acidic functional groups, thus can be converted to any base or acid addition salt.

The pharmaceutically acceptable salt of the present disclosure can be prepared from the parent compound that contains an acidic or basic moiety by conventional chemical method. Generally, such salt can be prepared by reacting the free acid or base form of the compound with a stoichiometric amount of an appropriate base or acid in water or an organic solvent or a mixture thereof.

The compounds of the present disclosure may exist in specific geometric or stereoisomeric forms. The present disclosure contemplates all such compounds, including cis and trans isomers, (−)- and (+)-enantiomers, (R)- and (S)-enantiomers, diastereomers isomers, (D)-isomers, (L)-isomers, and racemic and other mixtures thereof, such as enantiomers or diastereomeric enriched mixtures, all of which are within the scope of the present disclosure. Additional asymmetric carbon atoms may be present in substituents such as alkyl. All these isomers and their mixtures are included within the scope of the present disclosure.

Unless otherwise specified, the term "enantiomer" or "optical isomer" refers to stereoisomers that are mirror images of each other.

Unless otherwise specified, the term "cis-trans isomer" or "geometric isomer" is caused by the inability to rotate freely of double bonds or single bonds of ring-forming carbon atoms.

Unless otherwise specified, the term "diastereomer" refers to a stereoisomer in which a molecule has two or more chiral centers and the relationship between the molecules is not mirror images.

Unless otherwise specified, "(+)" refers to dextrorotation, "(−)" refers to levorotation, and or "(±)" refers to racemic.

Unless otherwise specified, the absolute configuration of a stereogenic center is represented by a wedged solid bond ( ◢ ) and a wedged dashed bond ( ◣ ), and the relative configuration of a stereogenic center is represented by a straight solid bond ( ◢ ) and a straight dashed bond ( ◣ ), a wave line ( ∿ ) is used to represent a wedged solid bond ( ◢ ) or a wedged dashed bond ( ◣ ), or the wave line ( ∿ ) is used to represent a straight solid bond ( ◢ ) and a straight dashed bond ( ◣ ).

Unless otherwise specified, when double bond structure, such as carbon-carbon double bond, carbon-nitrogen double bond, and nitrogen-nitrogen double bond, exists in the compound, and each of the atoms on the double bond is connected to two different substituents (including the condition where a double bond contains a nitrogen atom, the lone pair of electrons attached on the nitrogen atom is regarded as a substituent connected), if the atom on the double bond in the compound is connected to its substituent by a wave line ( ∿ ), this refers to the (Z) isomer, (E) isomer or a mixture of two isomers of the compound. For example, the following formula (A) means that the compound exists as a single isomer of formula (A-1) or formula (A-2) or as a mixture of two isomers of formula (A-1) and formula (A-2); the following formula (B) means that the compound exists in the form of a single isomer of formula (B-1) or formula (B-2) or in the form of a mixture of two isomers of formula (B-1) and formula (B-2). The following formula (C) means that the compound exists as a single isomer of formula (C-1) or formula (C-2) or as two a mixture of two isomers of formula (C-1) and formula (C-2).

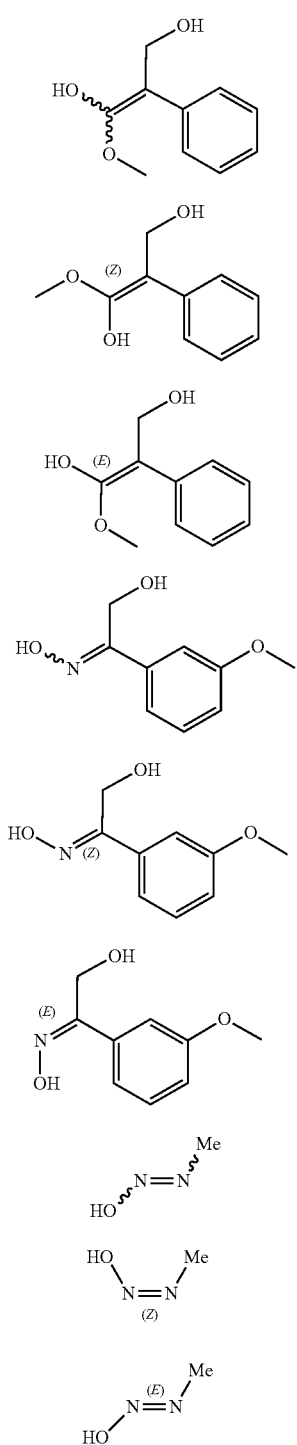

Unless otherwise specified, the term "tautomer" or "tautomeric form" means that at room temperature, the isomers of different functional groups are in dynamic equilibrium and can be transformed into each other quickly. If tautomers possibly exist (such as in solution), the chemical equilibrium of tautomers can be reached. For example, proton tautomer (also called prototropic tautomer) includes interconversion through proton migration, such as keto-enol isomerization and imine-enamine isomerization. Valence tautomer includes some recombination of bonding electrons for mutual transformation. A specific example of keto-enol tautomerization is the tautomerism between two tautomers of pentan-2,4-dione and 4-hydroxypent-3-en-2-one.

Unless otherwise specified, the terms "enriched in one isomer", "enriched in isomers", "enriched in one enantiomer" or "enriched in enantiomers" refer to the content of one of the isomers or enantiomers is less than 100%, and the content of the isomer or enantiomer is greater than or equal to 60%, or greater than or equal to 70%, or greater than or equal to 80%, or greater than or equal to 90%, or greater than or equal to 95%, or greater than or equal to 96%, or greater than or equal to 97%, or greater than or equal to 98%, or greater than or equal to 99%, or greater than or equal to 99.5%, or greater than or equal to 99.6%, or greater than or equal to 99.7%, or greater than or equal to 99.8%, or greater than or equal to 99.9%.

Unless otherwise specified, the term "isomer excess" or "enantiomeric excess" refers to the difference between the relative percentages of two isomers or two enantiomers. For example, if the content of one isomer or enantiomer is 90%, and the content of the other isomer or enantiomer is 10%, the isomer or enantiomer excess (ee value) is 80%.

Optically active (R)- and (S)-isomer, or D and L isomer can be prepared using chiral synthesis or chiral reagents or other conventional techniques. If one kind of enantiomer of certain compound of the present disclosure is to be obtained, the pure desired enantiomer can be obtained by asymmetric synthesis or derivative action of chiral auxiliary followed by separating the resulting diastereomeric mixture and cleaving the auxiliary group. Alternatively, when the molecule contains a basic functional group (such as amino) or an acidic functional group (such as carboxyl), the compound reacts with an appropriate optically active acid or base to form a salt of the diastereomeric isomer which is then subjected to diastereomeric resolution through the conventional method in the art to obtain the pure enantiomer. In addition, the enantiomer and the diastereoisomer are generally isolated through chromatography which uses a chiral stationary phase and optionally combines with a chemical derivative method (such as carbamate generated from amine).

The compound of the present disclosure may contain an unnatural proportion of atomic isotope at one or more than one atom(s) that constitute the compound. For example, the compound can be radiolabeled with a radioactive isotope, such as tritium ($^3H$), iodine-125 ($^{125}I$) or C-14 ($^{14}C$). For another example, deuterated drugs can be formed by replacing hydrogen with heavy hydrogen, the bond formed by deuterium and carbon is stronger than that of ordinary hydrogen and carbon, compared with non-deuterated drugs, deuterated drugs have the advantages of reduced toxic and side effects, increased drug stability, enhanced efficacy, extended biological half-life of drugs, etc. All isotopic variations of the compound of the present disclosure, whether radioactive or not, are encompassed within the scope of the present disclosure. The term "optional" or "optionally" means that the subsequent event or condition may occur but not requisite, that the term includes the instance in which the event or condition occurs and the instance in which the event or condition does not occur.

The term "substituted" means one or more than one hydrogen atom(s) on a specific atom are substituted with the substituent, which may include deuterium and hydrogen variables, as long as the valence of the specific atom is normal and the substituted compound is stable. When the substituent is an oxygen (i.e., =O), it means two hydrogen atoms are substituted. Positions on an aromatic ring cannot be substituted with a ketone. The term "optionally substituted" means an atom can be substituted with a substituent or not, unless otherwise specified, the type and number of the substituent may be arbitrary as long as being chemically achievable.

When any variable (such as R) occurs in the constitution or structure of the compound more than once, the definition of the variable at each occurrence is independent. Thus, for example, if a group is substituted with 0-2 R, the group can be optionally substituted with up to two R, wherein the definition of R at each occurrence is independent. Moreover, a combination of the substituent and/or the variant thereof is allowed only when the combination results in a stable compound.

When the number of a linking group is 0, such as —(CRR)$_0$—, it means that the linking group is a single bond.

When one of the variables is selected from a single bond, it means that the two groups linked by the single bond are connected directly. For example, when L in A-L-Z represents a single bond, the structure of A-L-Z is actually A-Z.

When a substituent is vacant, it means that the substituent does not exist, for example, when X is vacant in A-X, the structure of A-X is actually A. When the enumerative substituent does not indicate by which atom it is linked to the group to be substituted, such substituent can be bonded by any atom thereof. For example, when pyridyl acts as a substituent, it can be linked to the group to be substituted with any carbon atom on the pyridine ring.

When the enumerative linking group does not indicate the direction for linking, the direction for linking is arbitrary, for example, the linking group L contained in

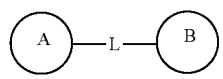

is -M-W—, then -M-W— can link ring A and ring B to form

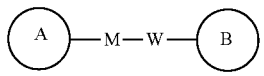

in the direction same as left-to-right reading order, and form

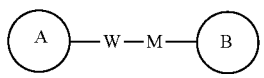

in the direction contrary to left-to-right reading order. A combination of the linking groups, substituents and/or variables thereof is allowed only when such combination can result in a stable compound.

Unless otherwise specified, when a group has one or more linkable sites, any one or more sites of the group can be linked to other groups through chemical bonds. When the linking site of the chemical bond is not positioned, and there is H atom at the linkable site, then the number of H atom at the site will decrease correspondingly with the number of chemical bond linking thereto so as to meet the corresponding valence. The chemical bond between the site and other groups can be represented by a straight solid bond ( ⁄ ), a straight dashed bond ( ⁄⋯ ) or a wavy line

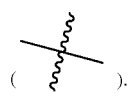

For example, the straight solid bond in —OCH$_3$ means that it is linked to other groups through the oxygen atom in the group; the straight dashed bonds in

means that it is linked to other groups through the two ends of nitrogen atom in the group; the wave lines in

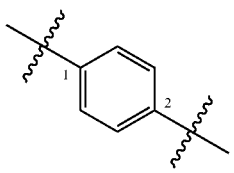 [SMILES: *c1ccc(*)cc1]

means that the phenyl group is linked to other groups through carbon atoms at position 1 and position 2;

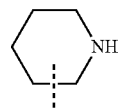

means that it can be linked to other groups through any linkable sites on the piperidinyl by one chemical bond, including at least four types of linkage, including

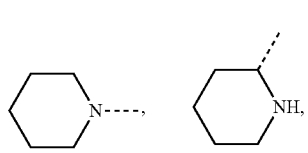

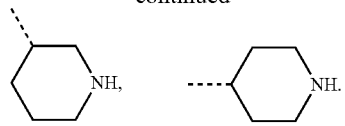

Even though the H atom is drawn on the —N—,

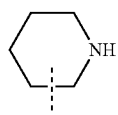

still includes the linkage of

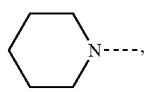

merely when one chemical bond was connected, the H of this site will be reduced by one to the corresponding monovalent piperidinyl.

Unless otherwise specified, the term "$C_{1-3}$ alkyl" refers to a linear or branched saturated hydrocarbon group containing 1 to 3 carbon atoms. The $C_{1-3}$ alkyl includes $C_{1-2}$ and $C_{2-3}$ alkyl, etc; it can be monovalent (such as methyl), divalent (such as methylene) or multivalent (such as methine). Examples of $C_{1-3}$ alkyl include but are not limited to methyl (Me), ethyl (Et), propyl (including n-propyl and isopropyl), etc.

Unless otherwise specified, $C_{n-n+m}$ or $C_n-C_{n+m}$ includes any specific case of n to n+m carbons, for example, $C_{1-12}$ includes $C_1$, $C_2$, $C_3$, $C_4$, $C_5$, $C_6$, $C_7$, $C_8$, $C_9$, $C_{10}$, $C_{11}$, and $C_{12}$, and any range from n to n+m is also included, for example $C_{1-12}$ includes $C_{1-3}$, $C_{1-6}$, $C_{1-9}$, $C_{3-6}$, $C_{3-9}$, $C_{3-12}$, $C_{6-9}$, $C_{6-12}$, and $C_{9-12}$, etc.; similarly, n membered to n+m membered means that the number of atoms on the ring is from n to n+m, for example, 3-12 membered ring includes 3 membered ring, 4 membered ring, 5 membered ring, 6 membered ring, 7 membered ring, 8 membered ring, 9 membered ring, 10 membered ring, 11 membered ring, and 12 membered ring, and any range from n to n+m is also included, for example, 3-12 membered ring includes 3-6 membered ring, 3-9 membered ring, 5-6 membered ring, 5-7 membered ring, 6-7 membered ring, 6-8 membered ring, and 6-10 membered ring, etc.

The term "leaving group" refers to a functional group or atom which can be replaced by another functional group or atom through a substitution reaction (such as affinity substitution reaction). For example, representative leaving groups include triflate; chlorine, bromine, and iodine; sulfonate group, such as mesylate, tosylate, p-bromobenzenesulfonate, p-toluenesulfonates, etc.; acyloxy, such as acetoxy, trifluoroacetoxy, etc.

The term "protecting group" includes, but is not limited to "amino protecting group", "hydroxyl protecting group" or "thio protecting group". The term "amino protecting group" refers to a protecting group suitable for blocking the side reaction on the nitrogen of an amino. Representative amino protecting groups include, but are not limited to: formyl; acyl, such as alkanoyl (e.g., acetyl, trichloroacetyl or trifluoroacetyl); alkoxycarbonyl, such as tert-butoxycarbonyl (Boc); arylmethoxycarbonyl such as benzyloxycarbonyl (Cbz) and 9-fluorenylmethoxycarbonyl (Fmoc); arylmethyl, such as benzyl (Bn), trityl (Tr), 1,1-bis-(4'-methoxyphenyl) methyl; silyl, such as trimethylsilyl (TMS) and tert-butyldimethylsilyl (TBS), etc. The term "hydroxyl protecting group" refers to a protecting group suitable for blocking the side reaction on hydroxyl. Representative hydroxyl protecting groups include, but are not limited to: alkyl, such as methyl, ethyl, and tert-butyl; acyl, such as alkanoyl (e.g., acetyl); arylmethyl, such as benzyl (Bn), p-methoxybenzyl (PMB), 9-fluorenylmethyl (Fm), and diphenylmethyl (benzhydryl, DPM); silyl, such as trimethylsilyl (TMS) and tert-butyl dimethyl silyl (TBS), etc.

The compounds of the present disclosure can be prepared by a variety of synthetic methods known to those skilled in the art, including the specific embodiments listed below, the embodiments formed by their combination with other chemical synthesis methods, and equivalent alternatives known to those skilled in the art, preferred implementations include but are not limited to the embodiments of the present disclosure.

The structure of the compounds of the present disclosure can be confirmed by conventional methods known to those skilled in the art, and if the disclosure involves an absolute configuration of a compound, then the absolute configuration can be confirmed by means of conventional techniques in the art. For example, in the case of single crystal X-ray diffraction (SXRD), diffraction intensity data of a cultured single crystal are collected by a Bruker D8 venture diffractometer, using CuKα radiation as a light source and φ/ω scanning as a scanning mode. After collecting relevant data, the absolute configuration can be confirmed by further analyzing the structure of the crystal form with a direct method (Shelxs97).

The solvent used in the present disclosure is commercially available. The following abbreviations are used in the present disclosure: aq stands for water; eq stands for equivalent or equivalence.

The compounds of the present disclosure are named according to the conventional naming principles in the art or by ChemDraw® software, and the commercially available compounds use the supplier catalog names.

DETAILED DESCRIPTION OF THE PREFERRED EMBODIMENT

The present disclosure will be specifically described below by way of embodiments, but it does not mean that there is any adverse restriction on the present disclosure. The present disclosure is described in detail herein, wherein specific embodiments thereof have also been disclosed. For those skilled in the art, it is obvious that various changes and improvements can be made to the specific embodiments of the present disclosure without departing from the spirit and scope of the present disclosure.

Intermediate I

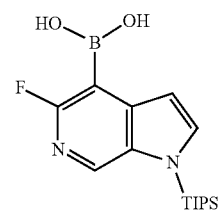

I

Synthetic Route:

Embodiment 1

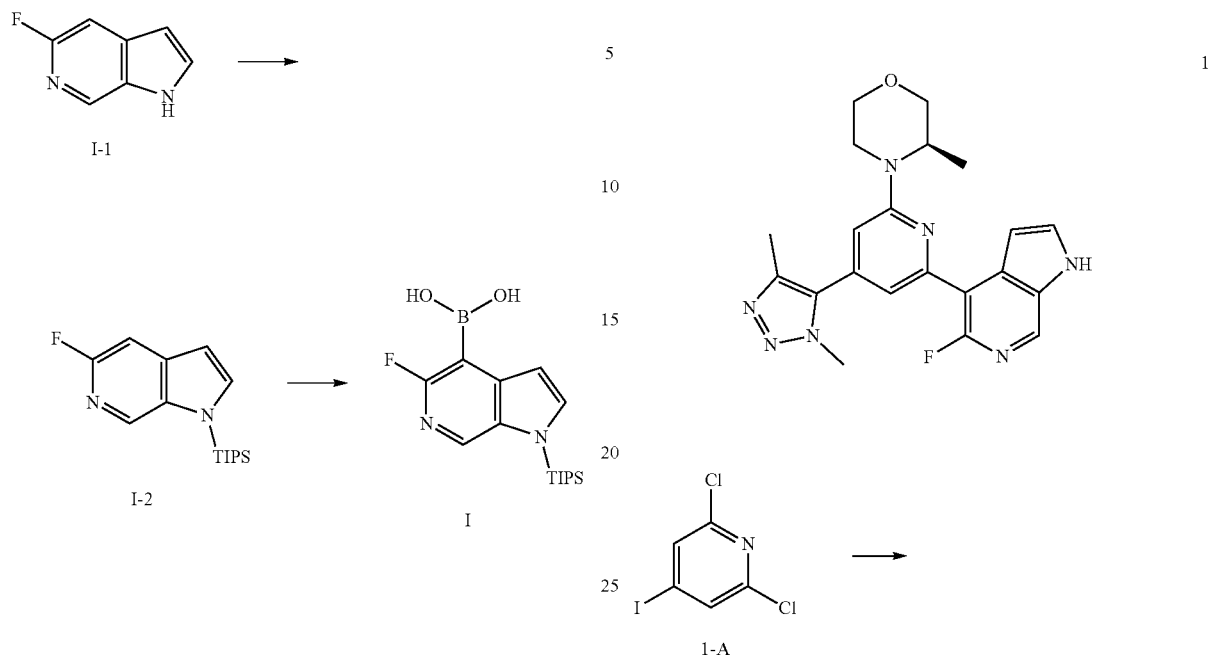

Step 1: Synthesis of Compound I-2

Sodium hydride (220.36 mg, 5.51 mmol, 60%) was added to a solution of compound I-1 (500 mg, 3.67 mmol) in tetrahydrofuran (30 mL), and the mixture was reacted at room temperature of 20° C. for 1 hour. Triisopropylsilane (849.80 mg, 4.41 mmol) was added thereto, and the mixture was reacted at room temperature of 20° C. for 2.5 hours. After the reaction was completed, 10 mL of saturated aqueous ammonium chloride solution was added to the reaction solution to quench the reaction. 60 mL of water was added thereto, and the mixture was extracted with ethyl acetate (70 mL*3). The organic phase was washed once with saturated brine, dried over anhydrous sodium sulfate, filtered to obtain filtrate, and dried under reduced pressure. The crude product was separated by column chromatography (ethyl acetate/petroleum ether: 0-20%) to obtain compound I-2.

MS m/z: 293.0 [M+H]$^+$.

Step 2: Synthesis of Compound I

Compound I-2 (200 mg, 683.84 μmol) was placed in a three-necked flask, and anhydrous tetrahydrofuran (12 mL) was added thereto, and the system was replaced with nitrogen. The reaction solution was cooled to −78° C., and lithium diisopropylamide (2 M, 683.84 μL, 2 eq) was added thereto, and the mixture was stirred for 30 minutes. Trimethyl borate (99.48 mg, 957.38 μmol, 108.13 μL, 1.4 eq) was added thereto, and the mixture was heated to room temperature of 18° C. and stirred for 1 hour. After the reaction was completed, 10 mL of saturated aqueous ammonium chloride solution was added to the reaction solution and the mixture was stirred for 15 minutes. The mixture was extracted with ethyl acetate (30 mL*3), and the organic phase was washed once with saturated brine, dried over anhydrous sodium sulfate, filtered to obtain filtrate, and dried under reduced pressure. Intermediate I was obtained.

MS m/z: 337.1 [M+H]$^+$.

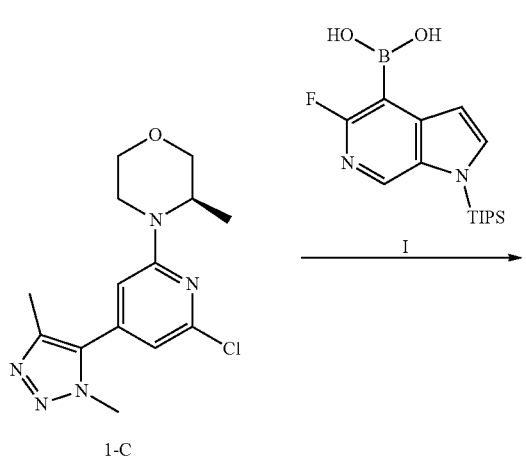

1H) 3.84 (br s, 2H) 4.00-4.13 (m, 5H) 4.38 (br d, J=4.02 Hz, 1H) 6.46 (br s, 1H) 7.08 (br s, 1H) 7.14 (br s, 1H) 7.54 (br s, 1H) 8.40 (br s, 1H) 8.85 (br s, 1H).

Embodiment 2

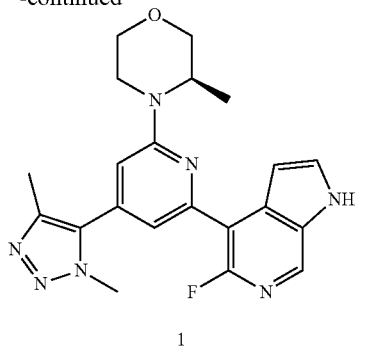

1

Step 1: Synthesis of Compound 1-B (R)-3-Methylmorpholine (2.38 g, 23.51 mmol, 2 eq) and potassium carbonate (3.25 g, 23.51 mmol, 63.60 μL, 2 eq) were added to a solution of compound 1-A (3.22 g, 11.76 mmol, 1 eq) in N,N-dimethylformamide (20.00 mL) at room temperature, and then the mixture was stirred at 130° C. under nitrogen atmosphere for 18 hours. The reaction system was diluted with water (60 mL), washed with ethyl acetate (50 mL×3), washed with saturated brine (50 mL), and dried over anhydrous sodium sulfate. After filtering off the desiccant, the solvent was removed under reduced pressure to obtain a crude product. The crude product was purified by column chromatography (petroleum ether/ethyl acetate: 0%-20%) to obtain compound 1-B.

MS-ESI m/z: 339.0 [M+H]⁺.

Step 2: Synthesis of Compound 1-C

Palladium acetate (34.81 mg, 155.06 μmol, 0.07 eq) and tricyclohexylphosphine (93.18 mg, 332.28 μmol, 107.72 μL, 0.15 eq) were added to a solution of compound 1-B (0.75 g, 2.22 mmol, 1 eq), 1,4-dimethyl-1H-1,2,3-triazole (258.16 mg, 2.66 mmol, 1.2 eq) and potassium carbonate (918.48 mg, 6.65 mmol, 3 eq) in N,N-dimethylacetamide (2 mL), bubbled with nitrogen, and the reaction was stirred at 110° C. for 1 hour under microwave irradiation. After the reaction solution was cooled, the reaction solution was filtered and concentrated under reduced pressure to obtain a crude product, and the crude product was purified by column chromatography (petroleum ether/ethyl acetate: 8%-50%) to obtain compound 1-C.

MS-ESI m/z: 308.1 [M+H]⁺.

Step 3: Synthesis of Compound 1

Compound 1-C (160 mg, 519.86 μmol) was placed in a microwave reactor, then ethylene glycol dimethyl ether (5 mL) was added thereto, and intermediate I (174.82 mg, 519.86 μmol), aqueous sodium carbonate solution (2 M, 1.82 mL) and [1,1-bis(diphenylphosphino)ferrocene]dichloropalladium dichloromethane complex (42.45 mg, 51.99 μmol) were added thereto. The mixture was bubbled with nitrogen for 2 minutes, heated to 110° C. and stirred for 0.5 hours under microwave irradiation. After the reaction was completed, 60 mL of water was added to the reaction solution, and the reaction solution was extracted with 210 mL (70*3) of ethyl acetate. The organic phase was washed once with saturated brine, dried over anhydrous sodium sulfate, filtered to obtain filtrate, and dried under reduced pressure. The crude product was separated by column chromatography (tetrahydrofuran/petroleum ether: 20-80%) to obtain compound 1.

MS m/z: 408.2 [M+H]⁺.

¹H NMR (400 MHz, CDCl₃) δ ppm 1.37 (br d, J=6.27 Hz, 3H) 2.42 (s, 3H) 3.27-3.40 (m, 1H) 3.67 (br t, J=10.92 Hz,

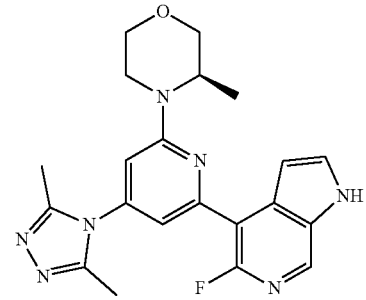

2

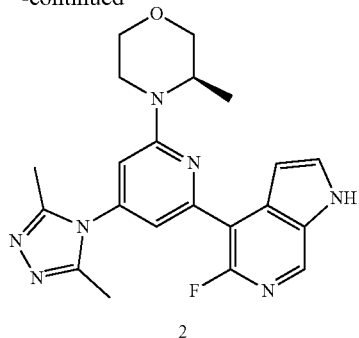

2

Step 1: Synthesis of Compound 2-B

Sodium carbonate (1.27 g, 11.96 mmol) was added to a solution of compound 2-A (1.5 g, 9.20 mmol), (R)-3-methylmorpholine (977.31 mg, 9.66 mmol) in 1-methyl-2-pyrrolidone (10 mL). After the reaction was stirred at 210° C. for 2 hours under microwave irradiation and then heated to 220° C. and stirred for 3*2 hours (reaction in 2 batches), the reaction solution was diluted with water (100 mL). The aqueous phase was extracted with ethyl acetate (70 mL×3), and the organic phases were combined. The organic phases were washed with water (40 mL×3) and saturated brine (80 mL) respectively, dried over anhydrous sodium sulfate, filtered, and concentrated to obtain a crude product. The crude product was purified by column chromatography (petroleum ether/ethyl acetate: 10%-35%) to obtain compound 2-B.

MS-ESI m/z: 227.9 [M+H]+.

Step 2: Synthesis of Compound 2-C

N,N-Dimethylacetamide dimethyl acetal (2.22 g, 16.69 mmol) was added to a solution of compound 2-B (0.95 g, 4.17 mmol) in N,N-dimethylformamide (10 mL). The reaction solution was stirred at 100° C. for 1 hour, and then concentrated under reduced pressure to obtain a crude product of compound 2-C.

MS-ESI m/z: 297.1 [M+H]+.

Step 3: Synthesis of Compound 2-D

Glacial acetic acid (15 mL) was added to compound 2-C (1.3 g, 4.38 mmol) and acetohydrazide (1.62 g, 21.90 mmol), and the reaction was heated to 100° C. and stirred for 1.5 hours. The pH of the reaction solution was adjusted to 7-8 with saturated sodium carbonate, and the reaction solution was extracted with ethyl acetate (100 mL×3). The organic phase was concentrated under reduced pressure to obtain a crude product, and the crude product was purified by column chromatography (petroleum ether/ethyl acetate: 30%-100%) to obtain compound 2-D.

MS-ESI m/z: 307.9 [M+H]+.

Step 4: Synthesis of Compound 2

Compound 2-D (210 mg, 682.31 μmol) was placed in a microwave reactor, then ethylene glycol dimethyl ether (2 mL) was added thereto, and intermediate I (269.94 mg, 682.31 μmol), aqueous sodium carbonate solution (2 M, 2.39 mL) and [1,1-bis(diphenylphosphino)ferrocene]dichloropalladium dichloromethane complex (55.72 mg, 68.23 μmol) were added thereto. The mixture was bubbled with nitrogen for 2 minutes, heated to 110° C. and stirred for 0.5 hours under microwave irradiation. After the reaction was completed, the reaction solution was washed once with saturated sodium bicarbonate, and the organic phase was extracted with 150 mL (50*3) of ethyl acetate, washed once with saturated brine, dried over anhydrous sodium sulfate, filtered to obtain filtrate, and dried under reduced pressure. The crude product was separated by column chromatography (methanol/dichloromethane: 0-20%) to obtain compound 2, and then further purified by preparative chromatographic column (Phenomenex Gemini-NX 80*30 mm*3 μm; mobile phase: [water (10 mM NH4HCO3)-ACN]; ACN %: 20%-50%, 9 minutes) to obtain compound 2. MS m/z: 408.1[M+H]+.

1H NMR (400 MHz, CDCl3) δ ppm 1.37 (d, J=6.78 Hz, 3H) 2.42 (s, 6H) 3.35 (td, J=12.61, 3.64 Hz, 1H) 3.67 (td, J=11.80, 3.01 Hz, 1H) 3.78-3.89 (m, 2H) 4.02-4.11 (m, 2H) 4.33 (br d, J=7.03 Hz, 1H) 6.32 (s, 1H) 7.02-7.09 (m, 2H) 7.58 (t, J=2.76 Hz, 1H) 8.42 (s, 1H) 9.25 (br s, 1H).

Embodiment 3

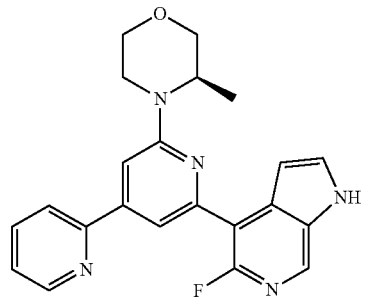

3

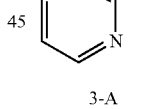

3-A

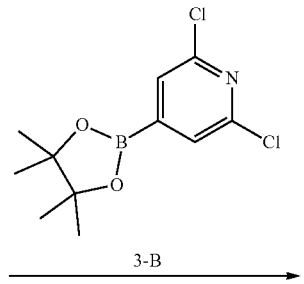

3-B

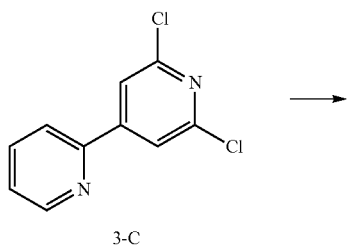

3-C

-continued

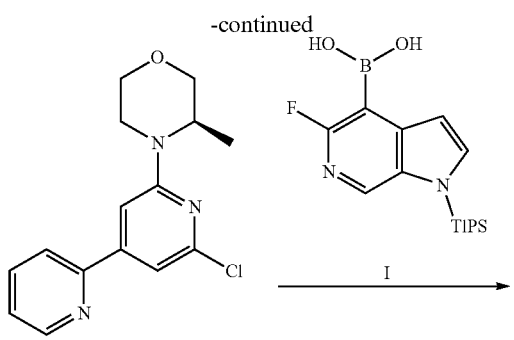

3-D

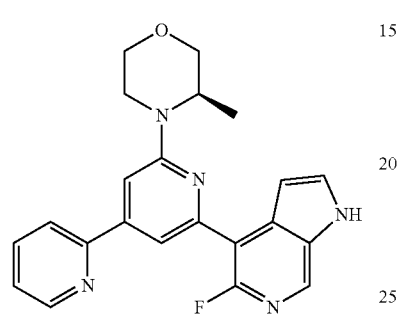

3

Step 1: Synthesis of Compound 3-C

Compound 3-A (500 mg, 3.16 mmol) was placed in a microwave reactor, and 1,4-dioxane (10 mL) and water (1 mL) were added thereto. Compound 3-B (866.96 mg, 3.16 mmol), sodium carbonate (838.54 mg, 7.91 mmol) and [1,1-bis(diphenylphosphino)ferrocene]dichloropalladium (155.49 mg, 221.52 μmol) were added thereto, bubbled with nitrogen for 2 minutes, heated to 110° C. and stirred for 0.5 hours under microwave irradiation. After the reaction was completed, 60 mL of water was added to the reaction solution, and the reaction solution was extracted with 210 mL (70*3) of ethyl acetate. The organic phase was washed once with saturated brine, dried over anhydrous sodium sulfate, filtered to obtain filtrate, and dried under reduced pressure. The crude product was separated by column chromatography (ethyl acetate/petroleum ether: 0-10%) to obtain compound 3-C. MS m/z: 224.8/226.7 [M+H]$^+$.

Step 2: Synthesis of Compound 3-D

Compound 3-C (370 mg, 1.64 mmol) was placed in a microwave reactor, and (R)-3-methylmorpholine (498.83 mg) was added thereto. The mixture was heated to 200° C. and stirred for 1 hour under microwave irradiation. After the reaction was completed, the reaction solution was dried under reduced pressure. The crude product was separated by column chromatography (ethyl acetate/petroleum ether: 0-30%) to obtain compound 3-D. MS m/z: 289.9 [M+H]$^+$.

Step 3: Synthesis of Compound 3

Compound 3-D (414.1 mg, 1.43 mmol) was dissolved in 1,4-dioxane (10 mL), and then intermediate I (624.77 mg, 1.86 mmol), aqueous sodium carbonate solution (2 M, 2.14 mL) and [1,1-bis(diphenylphosphino)ferrocene]dichloropalladium dichloromethane complex (58.35 mg, 71.46 μmol) were added thereto. The mixture was heated to 80° C. and reacted for 16 hours, and then the temperature was lowered to room temperature of 25° C. Tetraethylammonium fluoride hydrate (239.04 mg, 1.43 mmol) was added thereto and stirred for 2 hours. TLC monitored that the reaction was completed. After the reaction was completed, 60 mL of water was added to the reaction solution. The reaction solution was filtered through diatomite, and the filtrate was extracted with 210 mL (70*3) of ethyl acetate. The organic phase was washed once with saturated brine, dried over anhydrous sodium sulfate, filtered to obtain filtrate, and dried under reduced pressure. The crude product was separated by column chromatography (tetrahydrofuran/petroleum ether: 10-50%), and then further purified by preparative chromatographic column (Phenomenex Gemini-NX 80*30 mm*3 μm; mobile phase: [water (10 mM NH$_4$HCO$_3$)-ACN]; ACN %: 37%-67%, 9 minutes) to obtain compound 3. MS m/z: 390.0[M+H]$^+$.

$^1$H NMR (400 MHz, CDCl$_3$) δ 8.74 (br d, J=4.6 Hz, 1H), 8.65 (br s, 1H), 8.37 (s, 1H), 7.86-7.78 (m, 2H), 7.69 (d, J=2.3 Hz, 1H), 7.49 (t, J=2.8 Hz, 1H), 7.37-7.30 (m, 2H), 7.07 (br s, 1H), 4.57 (br d, J=6.6 Hz, 1H), 4.07 (br d, J=2.5 Hz, 1H), 4.04 (d, J=3.0 Hz, 1H), 3.83 (d, J=1.4 Hz, 2H), 3.67 (dt, J=2.6, 11.6 Hz, 1H), 3.38 (dt, J=3.8, 12.6 Hz, 1H), 1.36 (d, J=6.8 Hz, 3H)

Embodiment 4

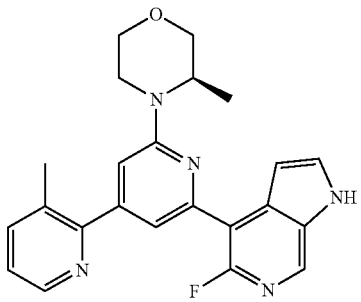

4

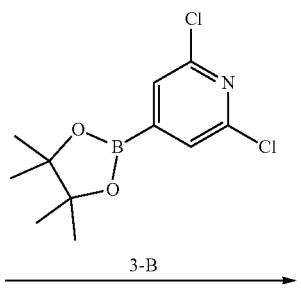

4-A

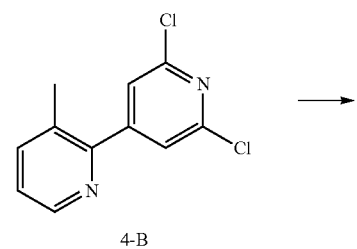

4-B

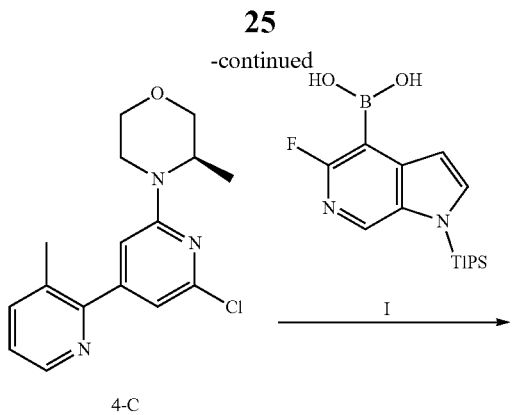

4-C

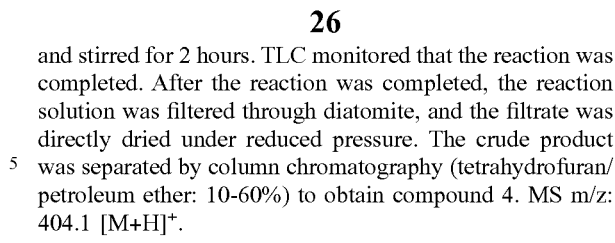

I

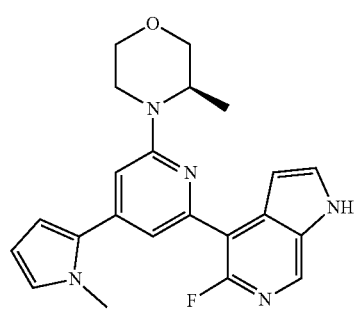

4

Step 1: Synthesis of Compound 4-C

Compound 4-A (500 mg, 2.91 mmol) was placed in a microwave reactor, and 1,4-dioxane (10 mL) and water (1 mL) were added thereto. Compound 3-B (875.89 mg, 3.20 mmol), sodium carbonate (924.21 mg, 8.72 mmol) and [1,1-bis(diphenylphosphino)ferrocene]dichloropalladium (142.81 mg, 203.46 μmol) were added thereto, purged with nitrogen for 2 minutes, heated to 110° C. and stirred for 0.5 hours under microwave irradiation. After the reaction was completed, 60 mL of water was added to the reaction solution, and the reaction solution was extracted with 210 mL (70*3) of ethyl acetate. The organic phase was washed once with saturated brine, dried over anhydrous sodium sulfate, filtered to obtain filtrate, and dried under reduced pressure. The crude product was separated by column chromatography (ethyl acetate/petroleum ether: 0-5%) to obtain compound 4-B. MS m/z: 238.87[M+H]$^+$.

Step 2: Synthesis of Compound 4-C

Compound 4-B (600 mg, 2.51 mmol) was placed in a microwave reactor, and (R)-3-methylmorpholine (761.45 mg, 7.53 mmol) was added thereto. The mixture was heated to 200° C. and stirred for 1 hour under microwave irradiation. After the reaction was completed, the reaction solution was dried under reduced pressure. The crude product was separated by column chromatography (ethyl acetate/petroleum ether: 0-25%) to obtain compound 4-C. MS m/z: 303.9 [M+H]$^+$.

Step 3: Synthesis of Compound 4

Compound 4-C (682.1 mg, 2.25 mmol) was dissolved in 1,4-dioxane (10 mL), and then intermediate I (981.59 mg, 2.92 mmol), aqueous sodium carbonate solution (2 M, 3.37 mL) and [1,1-bis(diphenylphosphino)ferrocene]dichloropalladium dichloromethane complex (91.68 mg, 112.27 μmol) were added thereto. After the mixture was heated to 80° C. and reacted for 16 hours, the protecting group was not completely removed, and the temperature was lowered to room temperature of about 20° C., and tetraethylammonium fluoride hydrate (375.57 mg, 2.25 mmol) was added thereto and stirred for 2 hours. TLC monitored that the reaction was completed. After the reaction was completed, the reaction solution was filtered through diatomite, and the filtrate was directly dried under reduced pressure. The crude product was separated by column chromatography (tetrahydrofuran/petroleum ether: 10-60%) to obtain compound 4. MS m/z: 404.1 [M+H]$^+$.

$^1$H NMR (400 MHz, CDCl$_3$) δ 8.79 (br s, 1H), 8.55 (d, J=4.1 Hz, 1H), 8.33 (s, 1H), 7.63 (d, J=7.6 Hz, 1H), 7.46 (t, J=2.8 Hz, 1H), 7.31 (d, J=2.6 Hz, 1H), 7.24 (d, J=4.9 Hz, 1H), 7.04 (br s, 1H), 6.74 (s, 1H), 4.50 (br d, J=6.6 Hz, 1H), 4.08-3.92 (m, 2H), 3.81 (s, 2H), 3.65 (dt, J=2.9, 11.7 Hz, 1H), 3.35 (dt, J=3.6, 12.5 Hz, 1H), 2.45 (s, 3H), 1.34 (d, J=6.6 Hz, 3H).

Embodiment 5

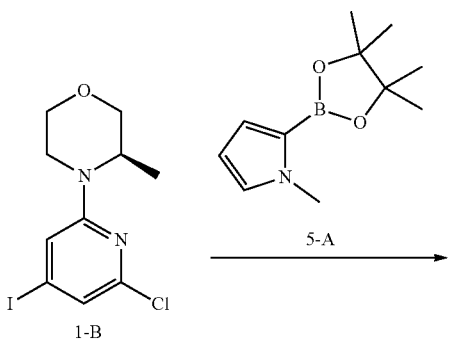

5

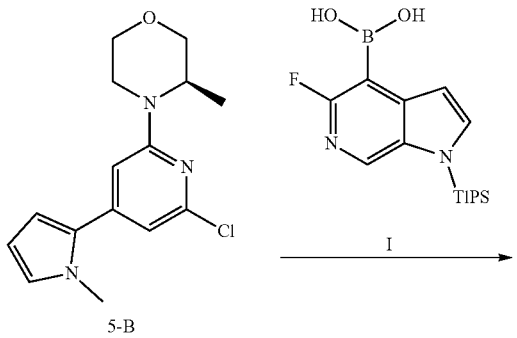

I

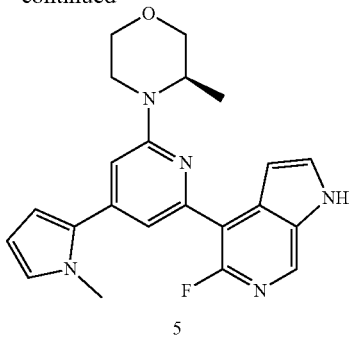

5

Step 1: Synthesis of Compound 5-B

Compound 1-B (300 mg, 886.08 μmol) was placed in a microwave reactor, and 1,4-dioxane (3 mL) and water (0.3 mL) were added thereto. Compound 5-A (201.83 mg, 974.68 μmol), sodium carbonate (281.74 mg, 2.66 mmol) and [1,1-bis(diphenylphosphino)ferrocene]dichloropalladium (43.54 mg, 62.03 μmol) were added thereto, bubbled with nitrogen for 2 minutes, heated to 100° C. and stirred for 1 hour under microwave irradiation. After the reaction was completed, the reaction solution was dried under reduced pressure, and then the sample was mixed with silica gel and purified. The crude product was separated by column chromatography (ethyl acetate/petroleum ether: 0-25%) to obtain compound 5-B. MS m/z: 291.9 [M+H]$^+$.

Step 2: Synthesis of Compound 5

Compound 5-B (158.9 mg, 544.60 μmol) was dissolved in 1,4-dioxane (10 mL), and then intermediate I (238.08 mg, 707.98 μmol), aqueous sodium carbonate solution (2 M, 816.90 μL) and [1,1-bis(diphenylphosphino)ferrocene]dichloropalladium dichloromethane complex (31.13 mg, 38.12 μmol) were added thereto. The mixture was heated to 100° C. and reacted for 16 hours. After the reaction was completed, the reaction solution was filtered through diatomite, and the filtrate was directly dried under reduced pressure. The crude product was separated by column chromatography (ethyl acetate/dichloromethane: 10-60%) to obtain compound 5. MS m/z: 392.0[M+H]$^+$.

$^1$H NMR (400 MHz, CDCl$_3$) δ 8.48 (br s, 1H), 8.36 (s, 1H), 7.49 (t, J=2.7 Hz, 1H), 7.08 (br s, 1H), 6.78 (s, 1H), 6.60 (s, 1H), 6.40 (br d, J=1.8 Hz, 1H), 6.23 (t, J=3.1 Hz, 1H), 4.41 (br d, J=7.0 Hz, 1H), 4.09-3.97 (m, 2H), 3.83 (s, 2H), 3.79 (s, 3H), 3.72-3.61 (m, 1H), 3.32 (dt, J=3.6, 12.6 Hz, 1H), 1.34 (d, J=6.6 Hz, 3H).

Embodiment 6

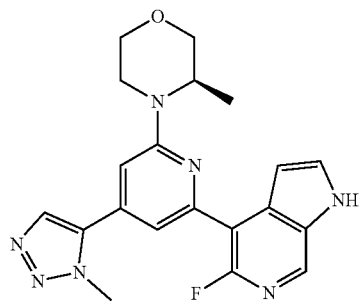

6

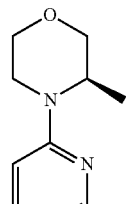

1-B

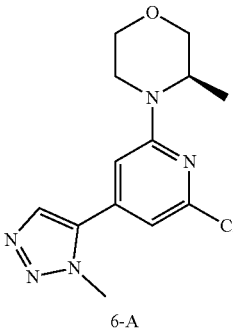

6-A

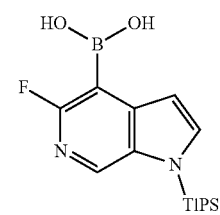

I

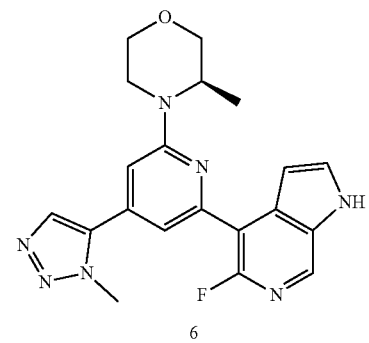

6

Step 1: Synthesis of Compound 6-A

Palladium acetate (53.05 mg, 236.29 μmol, 0.1 eq) and tricyclohexylphosphine (132.52 mg, 472.57 μmol, 0.2 eq) were added to a solution of compound 1-B (800 mg, 2.36 mmol, 1 eq), 1-methyl-1,2,3-triazole (294.50 mg, 3.54 mmol, 1.5 eq) and potassium acetate (436.79 mg, 4.73 mmol) in N,N-dimethylformamide (10 mL), bubbled with nitrogen, and the reaction was stirred at 120° C. for 1 hour under microwave irradiation. After the reaction solution was cooled, the reaction system was diluted with water (20 mL), washed with ethyl acetate (30 mL×3), washed with saturated brine (10 mL), and dried over anhydrous sodium sulfate. After filtering off the desiccant, the solvent was removed under reduced pressure to obtain a crude product. The crude product was purified by column chromatography (petroleum ether/ethyl acetate: 70%-90%) to obtain compound 6-A. MS-ESI m/z: 295.1 [M+H]$^+$.

Step 2: Synthesis of Compound 6

Compound 6-A (500 mg, 1.70 mmol) was placed in a microwave reactor, and 1,4-dioxane (5 mL) and water (0.5 mL) were added thereto. Intermediate I (572.40 mg, 1.70 mmol), sodium carbonate (451.02 mg, 4.26 mmol) and [1,1-bis(diphenylphosphino)ferrocene]dichloropalladium dichloromethane complex (139.00 mg, 170.21 μmol) were added thereto, and the system was replaced with nitrogen for 3 times, and the mixture was stirred at 80° C. for 12 hours. After the reaction solution was cooled, the reaction system was diluted with water (20 mL), washed with ethyl acetate (15 mL×3), washed with saturated brine (10 mL), and dried over anhydrous sodium sulfate. After filtering off the desiccant, the solvent was removed under reduced pressure to obtain a crude product. The crude product was separated by column chromatography (tetrahydrofuran/petroleum ether: 50-90%) to obtain compound 6.

MS m/z: 394.1 [M+H]+.

$^1$H NMR (400 MHz, CDCl3) δ 8.69 (br s, 1H), 8.40 (s, 1H), 7.84 (s, 1H), 7.54 (t, J=2.9 Hz, 1H), 7.23 (dd, J=0.9, 3.1 Hz, 1H), 7.06 (t, J=2.1 Hz, 1H), 6.55 (d, J=1.0 Hz, 1H), 4.43 (br d, J=7.3 Hz, 1H), 4.19 (s, 3H), 4.11-3.97 (m, 2H), 3.88-3.78 (m, 2H), 3.67 (dt, J=3.0, 11.8 Hz, 1H), 3.35 (dt, J=3.9, 12.6 Hz, 1H), 1.37 (d, J=6.8 Hz, 3H).

Embodiment 7

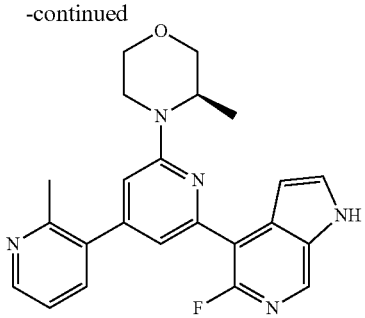

7

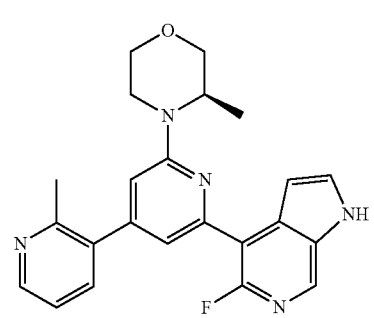

Step 1: Synthesis of Compound 7-B

Compound 1-B (300 mg, 886.08 μmol) was placed in a microwave reactor, and 1,4-dioxane (2 mL) and water (0.2 mL) were added thereto. Compound 7-A (213.54 mg, 974.68 μmol), sodium carbonate (281.74 mg, 2.66 mmol) and [1,1-bis(diphenylphosphino)ferrocene]dichloropalladium (64.83 mg, 88.61 μmol) were added thereto, purged with nitrogen for 2 minutes, heated to 100° C. and stirred for 1.5 hours under microwave irradiation. After the reaction was completed, the reaction solution was dried under reduced pressure, and then the sample was mixed with silica gel and purified. The crude product was separated by column chromatography (ethyl acetate/petroleum ether: 10-40%) to obtain compound 7-B. MS m/z: 303.9 [M+H]+.

Step 2: Synthesis of Compound 7

Compound 7-B (274 mg, 901.95 μmol) was dissolved in 1,4-dioxane (10 mL), and then intermediate I (454.97 mg, 1.35 mmol), aqueous sodium carbonate solution (2 M, 1.35 mL) and [1,1-bis(diphenylphosphino)ferrocene]dichloropalladium dichloromethane complex (51.56 mg, 63.14 μmol) were added thereto. The system was replaced with nitrogen for 3 times, and the mixture was heated to 80° C. and reacted for 16 hours. After the reaction was completed, the reaction solution was cooled to room temperature, then 40 mL of water was added to the reaction solution, and the reaction solution was extracted with 150 mL (50*3) of ethyl acetate. The organic phase was washed once with saturated brine, dried over anhydrous sodium sulfate, filtered to obtain filtrate, and dried under reduced pressure. The crude product was separated by column chromatography (ethyl acetate/dichloromethane: 10-50%) to obtain compound 7. MS m/z: 404.1[M+H]+.

$^1$H NMR (400 MHz, CDCl3) δ 8.70-8.55 (m, 2H), 8.38 (s, 1H), 7.72 (br d, J=6.9 Hz, 1H), 7.52 (br s, 1H), 7.33 (br s, 1H), 7.18 (br d, J=2.3 Hz, 1H), 7.09 (br s, 1H), 6.49 (s, 1H), 4.40 (br d, J=6.6 Hz, 1H), 4.09-3.98 (m, 2H), 3.83 (s, 2H), 3.73-3.62 (m, 1H), 3.39-3.28 (m, 1H), 2.68 (s, 3H), 1.36 (br d, J=6.8 Hz, 3H).

Embodiment 8

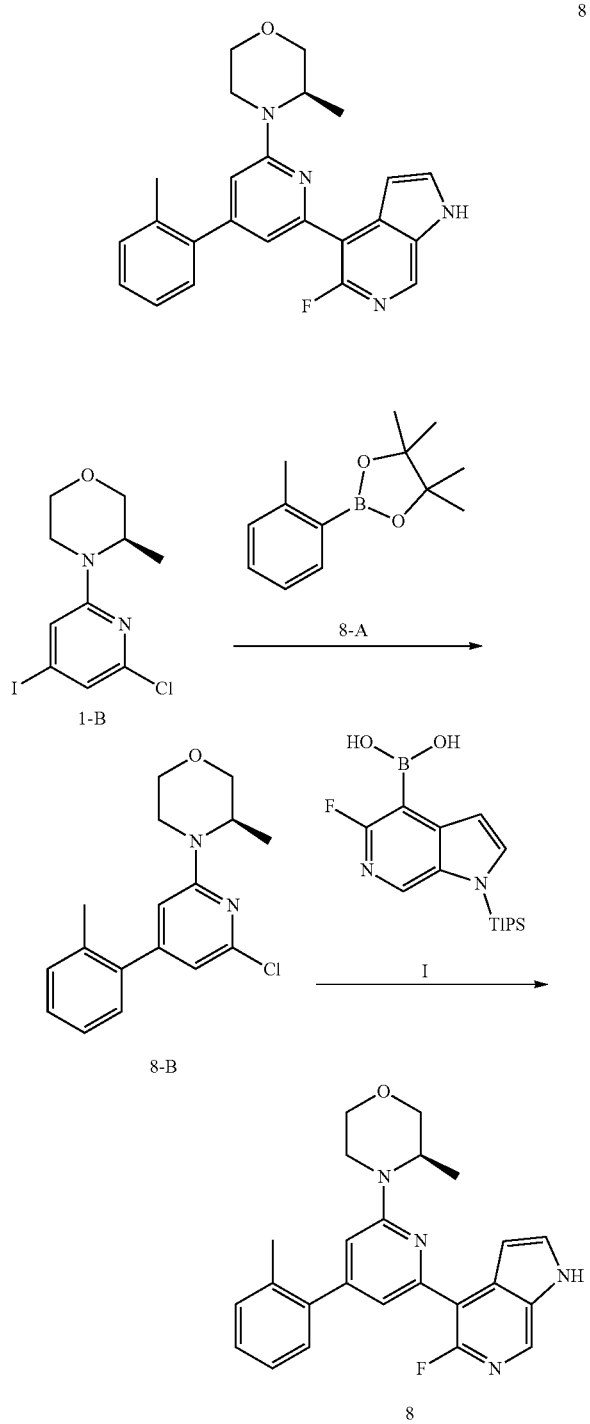

Step 1: Synthesis of Compound 1-B

Compound 1-B (300 mg, 886.08 μmol) was placed in a microwave reactor, and 1,4-dioxane (2 mL) and water (0.2 mL) were added thereto. Compound 8-A (212.58 mg, 974.68 μmol), sodium carbonate (281.74 mg, 2.66 mmol) and [1,1-bis(diphenylphosphino)ferrocene]dichloropalladium (64.83 mg, 88.61 μmol) were added thereto, bubbled with nitrogen for 2 minutes, heated to 100° C. and stirred for 1.5 hours under microwave irradiation. After the reaction was completed, the reaction solution was dried under reduced pressure, and then the sample was mixed with silica gel and purified. The crude product was separated by column chromatography (ethyl acetate/petroleum ether: 5-20%) to obtain compound 8-B. MS m/z: 302.9 [M+H]+.

Step 2: Synthesis of Compound 8

Compound 8-B (285 mg, 941.22 μmol) was dissolved in 1,4-dioxane (10 mL), and then intermediate I (474.78 mg, 1.41 mmol), aqueous sodium carbonate solution (2 M, 1.41 mL) and [1,1-bis(diphenylphosphino)ferrocene]dichloropalladium dichloromethane complex (53.80 mg, 65.89 μmol) were added thereto. The system was replaced with nitrogen for 3 times, and the mixture was heated to 80° C. and reacted for 16 hours. After the reaction was completed, 40 mL of water was added to the reaction solution, and the reaction solution was extracted with 150 mL (50*3) of ethyl acetate. The organic phase was washed once with saturated brine, dried over anhydrous sodium sulfate, filtered to obtain filtrate, and dried under reduced pressure. The crude product was separated by column chromatography (ethyl acetate/dichloromethane: 10-50%) to obtain compound 8. MS m/z: 403.1[M+H]+.

$^1$H NMR (400 MHz, CDCl$_3$) δ 7.49 (br s, 1H), 7.30 (br d, J=7.9 Hz, 6H), 7.20 (br s, 1H), 7.06-6.87 (m, 1H), 6.58 (br s, 1H), 4.42 (br s, 1H), 4.12-4.02 (m, 2H), 3.85 (br s, 2H), 3.72 (br s, 1H), 3.39 (br s, 1H), 2.38 (s, 3H), 1.38 (br d, J=5.5 Hz, 3H).

Embodiment 9

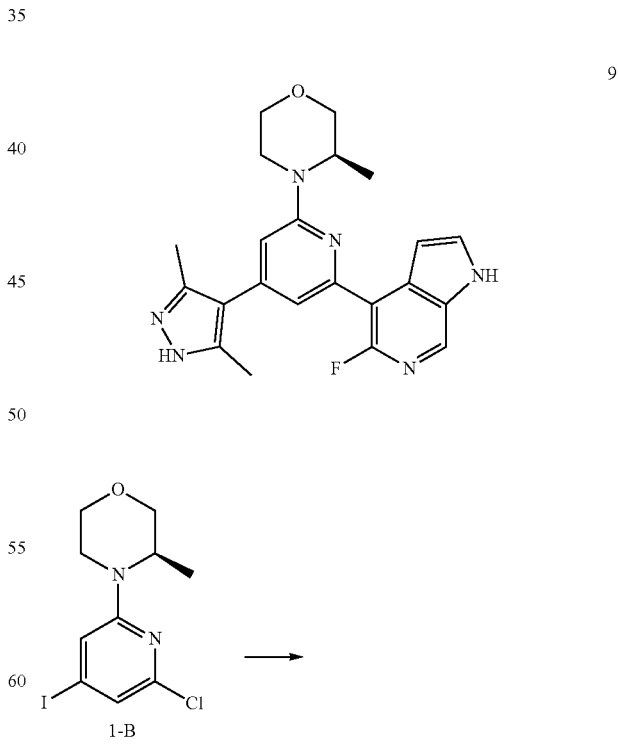

(m, 2H), 4.17-3.89 (m, 1H), 3.79-3.70 (m, 1H), 3.69-3.63 (m, 1H), 3.57-3.47 (m, 1H), 2.29 (br d, J=19.6 Hz, 6H), 1.19 (br d, J=6.5 Hz, 3H).

Embodiment 10

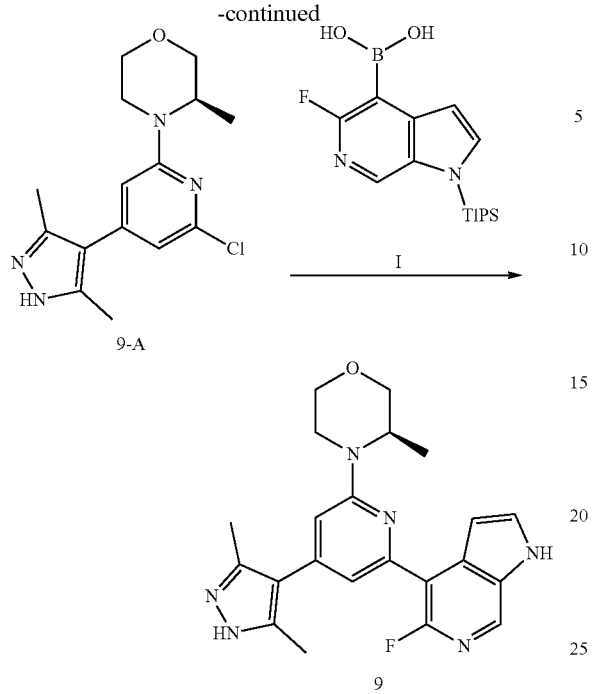

Step 1: Synthesis of Compound 9-A

[1,1-Bis(diphenylphosphino)ferrocene]dichloropalladium (64.83 mg, 88.61 μmol, 0.1 eq) was added to a solution of compound 1-B (300 mg, 886.08 μmol, 1 eq), 3,5-dimethylpyrazole-4-boronic acid, pinacol ester (216.47 mg, 974.68 μmol, 1.1 eq), sodium carbonate (140.87 mg, 1.33 mmol, 664.56 μL, 1.5 eq) in 1,4-dioxane (3 mL), bubbled with nitrogen, and the reaction was stirred at 100° C. for 1 hour under microwave irradiation. After the reaction solution was cooled, the reaction system was diluted with water (20 mL), washed with ethyl acetate (20 mL×3), washed with saturated brine (10 mL), and dried over anhydrous sodium sulfate. After filtering off the desiccant, the solvent was removed under reduced pressure to obtain a crude product. The crude product was purified by column chromatography (petroleum ether/ethyl acetate: 50%-60%) to obtain compound 9-A.

MS-ESI m/z: 306.9 [M+H]$^+$.

Step 2: Synthesis of Compound 9

Compound 7-A (200 mg, 651.91 μmol) was placed in a microwave reactor, and 1,4-dioxane (3 mL) and water (0.3 mL) were added thereto. Intermediate I (438.45 mg, 1.30 mmol), sodium carbonate (172.74 mg, 1.63 mmol) and [1,1-bis(diphenylphosphino)ferrocene]dichloropalladium dichloromethane complex (53.24 mg, 65.19 μmol) were added thereto. The mixture was bubbled with nitrogen for 2 minutes, heated to 110° C. and stirred for 1 hour under microwave irradiation. After the reaction solution was cooled, the reaction system was diluted with water (20 mL), washed with ethyl acetate (15 mL×3), washed with saturated brine (10 mL), and dried over anhydrous sodium sulfate. After filtering off the desiccant, the solvent was removed under reduced pressure to obtain a crude product. The crude product was separated by column chromatography (tetrahydrofuran/petroleum ether: 70-90%) to obtain compound 9.

MS m/z: 407.1 [M+H]$^+$.

$^1$H NMR (400 MHz, DMSO-d$_6$) δ 12.45 (br s, 1H), 11.74 (br s, 1H), 8.35 (s, 1H), 7.93-7.57 (m, 1H), 6.99 (d, J=2.0 Hz, 1H), 6.82 (br s, 1H), 6.61 (s, 1H), 4.38 (br s, 1H), 4.18-3.90

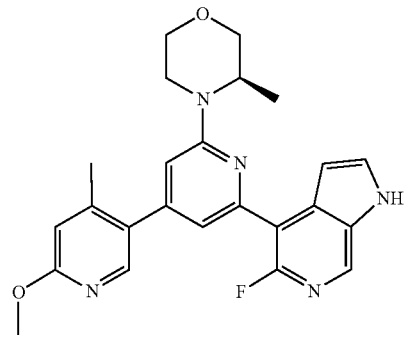

-continued

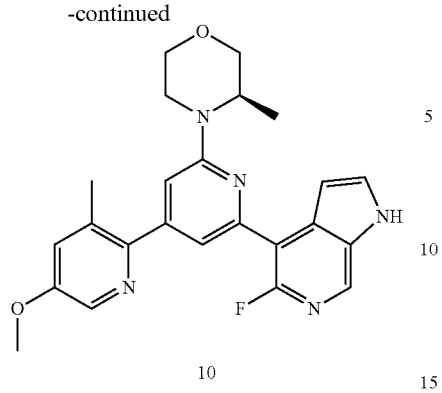

10

Step 1: Synthesis of Compound 10-B

Compound 10-A (300 mg, 1.48 mmol) was placed in a microwave reactor, and 1,4-dioxane (3 mL) and water (0.3 mL) were added thereto. Compound 3-B (445.99 mg, 1.63 mmol), sodium carbonate (470.60 mg, 4.44 mmol) and [1,1-bis(diphenylphosphino)ferrocene]dichloropalladium (72.72 mg, 103.60 µmol) were added thereto, purged with nitrogen for 2 minutes, heated to 110° C. and stirred for 0.5 hours under microwave irradiation. After the reaction was completed, 60 mL of water was added to the reaction solution, and the reaction solution was extracted with 210 mL (70*3) of ethyl acetate. The organic phase was washed once with saturated brine, dried over anhydrous sodium sulfate, filtered to obtain filtrate, and dried under reduced pressure. The crude product was separated by column chromatography (ethyl acetate/petroleum ether: 0-20%) to obtain compound 10-B. MS m/z: 268.8 [M+H]$^+$.

Step 2: Synthesis of Compound 10-C

Compound 10-B (300 mg, 1.11 mmol) was placed in a microwave reactor, and (R)-3-methylmorpholine (112.75 mg, 1.11 mmol) was added thereto. The mixture was heated to 200° C. and stirred for 2 hours under microwave irradiation. After the reaction was completed, the reaction solution was dried under reduced pressure, and most of (R)-3-methylmorpholine was removed under reduced pressure. The crude product was separated by column chromatography (ethyl acetate/petroleum ether: 0-30%) to obtain compound 10-C. MS m/z: 333.9 [M+H]$^+$.

Step 3: Synthesis of Compound 10

Compound 10-C (300 mg, 898.71 µmol) was dissolved in 1,4-dioxane (3 mL), and then intermediate I (453.33 mg, 1.35 mmol), aqueous sodium carbonate solution (2 M, 1.35 mL) and [1,1-bis(diphenylphosphino)ferrocene]dichloropalladium dichloromethane complex (73.39 mg, 89.87 µmol) were added thereto. The system was replaced with nitrogen for three times, and the mixture was heated to 100° C. and reacted for 16 hours, and then the temperature was lowered to room temperature of about 40° C. Tetraethylammonium fluoride hydrate (150.32 mg, 898.71 µmol) was added thereto and stirred for 2 hours. After the reaction was completed, 60 mL of water was added to the reaction solution. The mixture was extracted with 210 mL (70*3) of ethyl acetate, and the organic phase was washed once with saturated brine, dried over anhydrous sodium sulfate, filtered to obtain filtrate, and dried under reduced pressure. The crude product was separated by column chromatography (ethyl acetate/dichloromethane: 0-40%) to obtain compound 10. MS m/z: 434.1[M+H]$^+$.

$^1$H NMR (400 MHz, CDCl$_3$) δ 8.80 (br s, 1H), 8.33 (br s, 1H), 8.08 (s, 1H), 7.51 (br s, 1H), 7.16 (d, J=2.3 Hz, 1H), 7.05 (br s, 1H), 6.69 (s, 1H), 6.50 (s, 1H), 4.40 (br d, J=6.0 Hz, 1H), 4.10-4.03 (m, 2H), 3.97 (s, 3H), 3.84 (s, 2H), 3.74-3.63 (m, 1H), 3.41-3.27 (m, 1H), 2.35 (s, 3H), 1.36 (d, J=6.5 Hz, 3H).

Embodiment 11

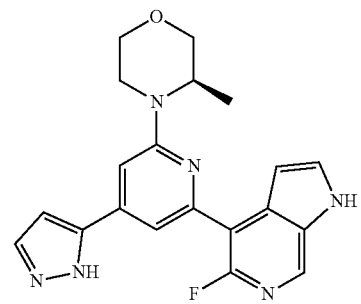

11

-continued

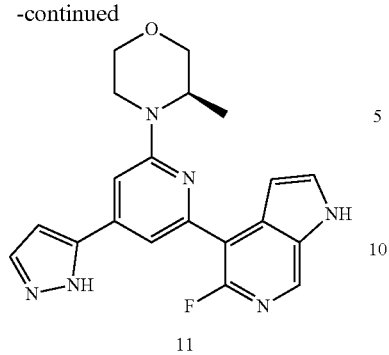
11

Step 1: Synthesis of Compound 1-C

Compound 1-B (500 mg, 1.48 mmol) was placed in a microwave reactor, and 1,4-dioxane (6 mL) and water (0.6 mL) were added thereto. Compound 11-A (315.21 mg, 1.62 mmol), sodium carbonate (469.58 mg, 4.43 mmol) and [1,1-bis(diphenylphosphino)ferrocene]dichloropalladium (75.64 mg, 103.38 μmol) were added thereto, purged with nitrogen for 2 minutes, heated to 110° C. and stirred for 0.5 hours under microwave irradiation. After the reaction was completed, the reaction solution was added with 40 mL of water, extracted with 150 mL (50*3) of ethyl acetate, and the organic phase was washed once with saturated brine, dried over anhydrous sodium sulfate, filtered to obtain filtrate, and dried under reduced pressure. The crude product was separated by column chromatography (ethyl acetate/petroleum ether: 0-30%) to obtain compound 11-B. MS m/z: 278.9 [M+H]$^+$.

Step 2: Synthesis of Compound 11-C

Compound 11-B (615 mg, 2.21 mmol) was placed in a microwave reactor, and 1,4-dioxane (10 mL) and water (1 mL) were added thereto. Intermediate I (964.56 mg, 2.87 mmol), sodium carbonate (701.56 mg, 6.62 mmol) and [1,1-bis(diphenylphosphino)ferrocene]dichloropalladium dichloromethane complex (126.13 mg, 154.45 μmol) were added thereto. The mixture was bubbled with nitrogen for 2 minutes, heated to 110° C. and reacted for 1 hour. After the reaction was completed, the reaction solution was filtered through diatomite to obtain filtrate, and then dried under reduced pressure to obtain the crude product of compound 11-C. MS m/z: 535.2[M+H]$^+$.

Step 3: Synthesis of Compound 11

Compound 11-C (1.02 g, 1.91 mmol) was dissolved in 1,4-dioxane (20 mL), and tetraethylammonium fluoride hydrate (319.05 mg, 1.91 mmol) was added thereto, heated to 40° C. and stirred for 2 hours. After the reaction was completed, the reaction solution was added with 40 mL of water, extracted with 150 mL (50*3) of ethyl acetate, and the organic phase was washed once with saturated brine, dried over anhydrous sodium sulfate, filtered to obtain filtrate, and dried under reduced pressure. The crude product was separated by column chromatography (ethyl acetate/dichloromethane: 10-50%) to obtain compound 11. MS m/z: 379.0 [M+H]$^+$.

$^1$H NMR (400 MHz, DMSO-d$_6$) δ 13.09 (br s, 1H), 11.76 (br s, 1H), 8.37 (s, 1H), 7.90-7.79 (m, 1H), 7.75 (t, J=2.8 Hz, 1H), 7.53 (br s, 1H), 7.14 (s, 1H), 6.93 (d, J=2.3 Hz, 1H), 6.79 (br s, 1H), 4.48 (br d, J=6.5 Hz, 1H), 4.02-3.91 (m, 2H), 3.79-3.72 (m, 1H), 3.72-3.65 (m, 1H), 3.53 (dt, J=2.8, 11.7 Hz, 1H), 3.17-3.16 (m, 1H), 1.20 (d, J=6.5 Hz, 3H).

Embodiment 12

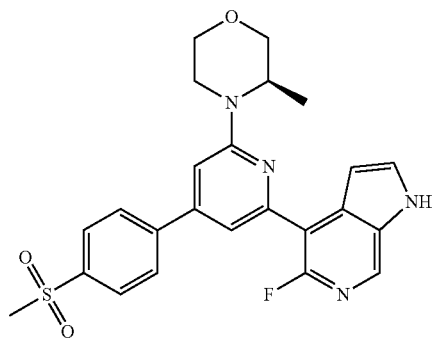
12

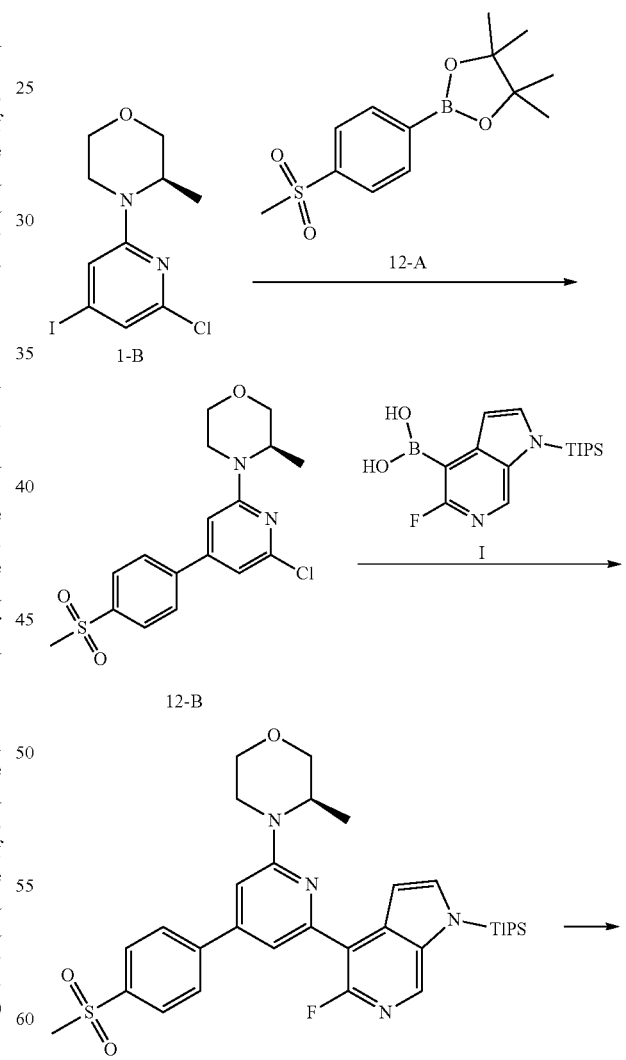

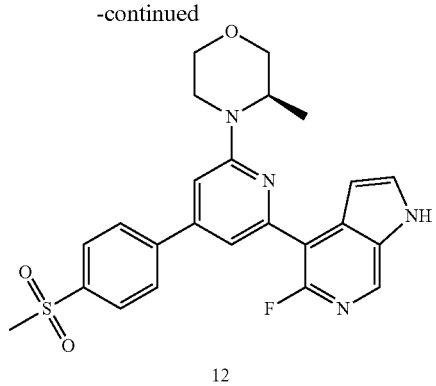

12

Embodiment 13

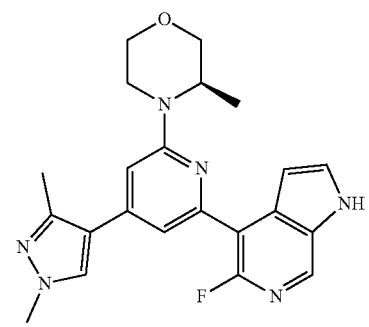

13

Step 1: Synthesis of Compound 12-B

Compound 1-B (500 mg, 1.48 mmol) was placed in a microwave reactor, and 1,4-dioxane (5 mL) and water (0.5 mL) were added thereto. Compound 12-A (458.37 mg, 1.62 mmol), sodium carbonate (469.58 mg, 4.43 mmol) and [1,1-bis(diphenylphosphino)ferrocene]dichloropalladium (75.64 mg, 103.38 μmol) were added thereto, purged with nitrogen for 2 minutes, heated to 110° C. and stirred for 0.5 hours under microwave irradiation. After the reaction was completed, the reaction solution was added with 40 mL of water, extracted with 150 mL (50*3) of ethyl acetate, and the organic phase was washed once with saturated brine, dried over anhydrous sodium sulfate, filtered to obtain filtrate, and dried under reduced pressure. The crude product was separated by column chromatography (ethyl acetate/petroleum ether: 5-30%) to obtain compound 12-B. MS m/z: 366.9 [M+H]$^+$.

Step 2: Synthesis of Compound 12-C

Compound 12-B (1.36 mmol) was placed in a microwave reactor, and 1,4-dioxane (5 mL) and water (0.5 mL) were added thereto. Intermediate I (595.82 mg, 1.77 mmol), sodium carbonate (433.36 mg, 4.09 mmol) and [1,1-bis(diphenylphosphino)ferrocene]dichloropalladium dichloromethane complex (111.30 mg, 136.29 μmol) were added thereto. The mixture was purged with nitrogen for 2 minutes, heated to 110° C. and reacted for 1 hour. After the reaction was completed, the reaction solution was filtered through diatomite to obtain filtrate, and then dried under reduced pressure to obtain the crude product of compound 12-C. MS m/z: 623.2[M+H]$^+$.

Step 3: Synthesis of Compound 12

Compound 12-C (1.19 g, 1.91 mmol) was dissolved in 1,4-dioxane (20 mL), and tetraethylammonium fluoride hydrate (319.05 mg, 1.91 mmol) was added thereto, heated to 40° C. and stirred for 2 hours. After the reaction was completed, the reaction solution was added with 50 mL of water, extracted with 150 mL (50*3) of ethyl acetate, and the organic phase was washed once with saturated brine, dried over anhydrous sodium sulfate, filtered to obtain filtrate, and dried under reduced pressure. The crude product was separated by column chromatography (ethyl acetate/dichloromethane: 10-60%) to obtain compound 12. MS m/z: 467.1 [M+H]$^+$.

$^1$H NMR (400 MHz, DMSO-d$_6$) δ 11.79 (br s, 1H), 8.39 (s, 1H), 8.10-8.01 (m, 4H), 7.77 (br s, 1H), 7.36 (br s, 1H), 7.07 (s, 1H), 6.82 (br s, 1H), 4.56 (br d, J=6.1 Hz, 1H), 4.08 (br d, J=12.3 Hz, 1H), 3.98 (br d, J=8.9 Hz, 1H), 3.81-3.73 (m, 1H), 3.72-3.65 (m, 1H), 3.54 (br t, J=10.8 Hz, 1H), 3.28 (s, 3H), 3.24-3.15 (m, 1H), 1.23 (br d, J=6.5 Hz, 3H).

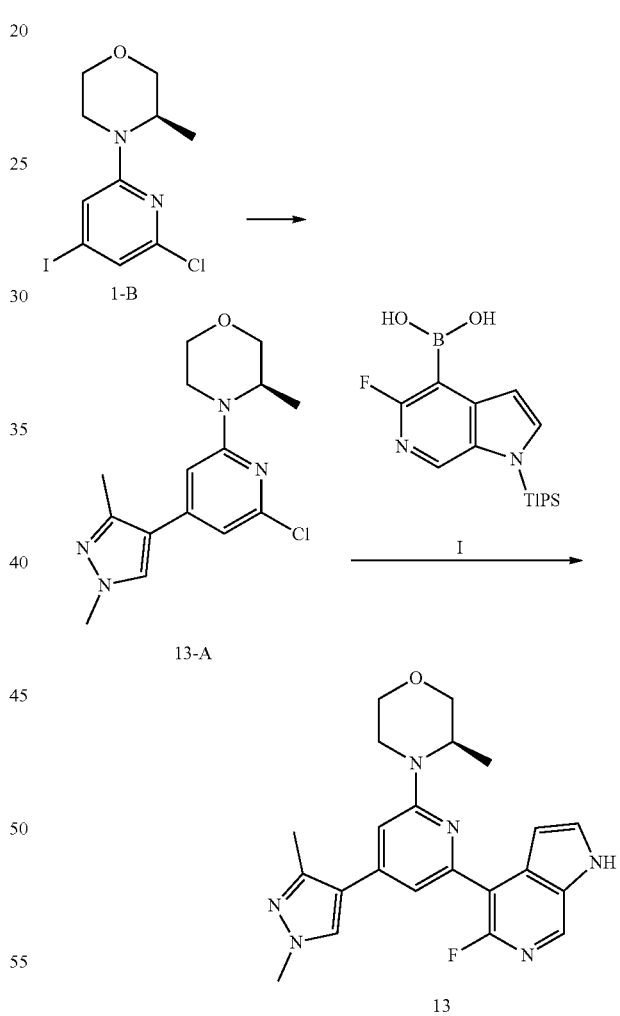

Step 1: Synthesis of Compound 13-A

[1,1-Bis(diphenylphosphino)ferrocene]dichloropalladium (64.84 mg, 88.61 μmol, 0.1 eq) was added to a solution of compound 1-B (300 mg, 886.08 μmol, 1 eq), 1,3-dimethylpyrazole-4-boronic acid, pinacol ester (216.47 mg, 974.68 μmol, 1.1 eq), sodium carbonate (140.87 mg, 1.33 mmol, 664.56 μL, 1.5 eq) in 1,4-dioxane (3 mL), bubbled with nitrogen, and the reaction was stirred at 100° C. for 1 hour under microwave irradiation. After the reaction solution was cooled, the reaction system was diluted with water (20 mL), washed with ethyl acetate (20 mL×3), washed with saturated brine (10 mL), and dried over anhydrous sodium sulfate. After filtering off the desiccant, the solvent was removed under reduced pressure to obtain a crude product. The crude product was purified by column chromatography (petroleum ether/ethyl acetate: 50%-70%) to obtain compound 13-A.

MS-ESI m/z: 306.9 [M+H]$^+$.

Step 2: Synthesis of Compound 13

Compound 13-A (170 mg, 554.13 μmol) was placed in a microwave reactor, and 1,4-dioxane (3 mL) and water (0.3 mL) were added thereto. Intermediate I (372.69 mg, 1.11 mmol), sodium carbonate (146.83 mg, 1.39 mmol) and [1,1-bis(diphenylphosphino)ferrocene]dichloropalladium dichloromethane complex (45.25 mg, 55.41 μmol) were added thereto. The mixture was bubbled with nitrogen for 2 minutes, heated to 110° C. and stirred for 1 hour under microwave irradiation. After the reaction solution was cooled, tetraethylammonium fluoride hydrate (139.03 mg, 831.19 μmol) was added to the reaction solution, and the mixture was stirred at 25° C. for 2 hours. The reaction system was diluted with water (20 mL), washed with ethyl acetate (15 mL×3), washed with saturated brine (10 mL), and dried over anhydrous sodium sulfate. After filtering off the desiccant, the solvent was removed under reduced pressure to obtain a crude product. The crude product was separated by column chromatography (tetrahydrofuran/petroleum ether: 50-70%) to obtain compound 13.

MS m/z: 407.1 [M+H]$^+$.

$^1$H NMR (400 MHz, DMSO-d$_6$) δ 11.76 (br s, 1H), 8.37 (s, 1H), 8.15 (s, 1H), 7.76 (br s, 1H), 7.15 (d, J=2.0 Hz, 1H), 6.81 (br s, 1H), 6.76 (s, 1H), 4.44 (br d, J=6.0 Hz, 1H), 4.02-3.92 (m, 2H), 3.81 (s, 3H), 3.78-3.72 (m, 1H), 3.71-3.65 (m, 1H), 3.58-3.48 (m, 1H), 3.15 (dt, J=3.5, 12.7 Hz, 1H), 2.38 (s, 3H), 1.20 (d, J=6.5 Hz, 3H).

Embodiment 14

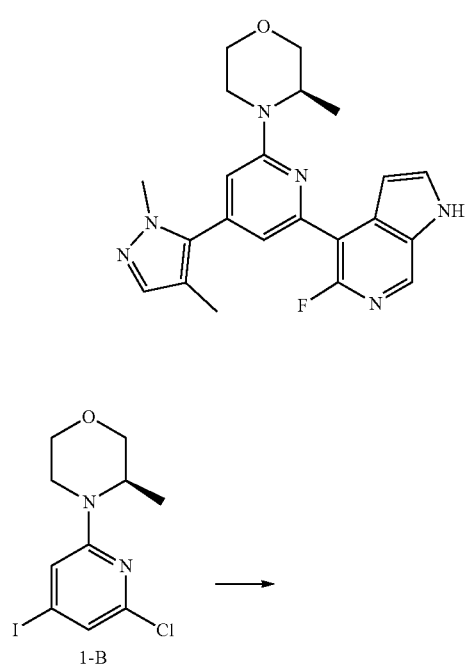

14

1-B

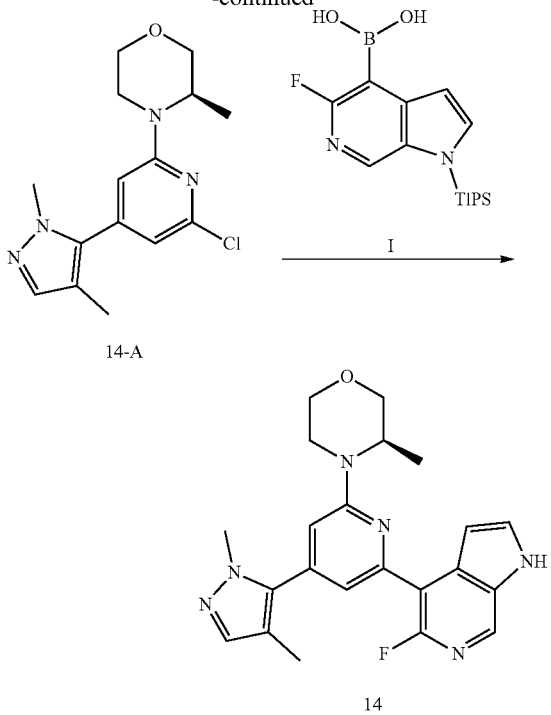

14-A

Step 1: Synthesis of Compound 14-A

[1,1-Bis(diphenylphosphino)ferrocene]dichloropalladium (64.83 mg, 88.61 μmol, 0.1 eq) was added to a solution of compound 1-B (300 mg, 886.08 μmol, 1 eq), 1,4-dimethylpyrazole-5-boronic acid, pinacol ester (216.47 mg, 974.68 μmol, 1.1 eq), sodium carbonate (140.87 mg, 1.33 mmol, 664.56 μL, 1.5 eq) in 1,4-dioxane (3 mL), bubbled with nitrogen, and the reaction was stirred at 100° C. for 1 hour under microwave irradiation. After the reaction solution was cooled, the reaction system was diluted with water (20 mL), washed with ethyl acetate (20 mL×3), washed with saturated brine (10 mL), and dried over anhydrous sodium sulfate. After filtering off the desiccant, the solvent was removed under reduced pressure to obtain a crude product. The crude product was purified by column chromatography (petroleum ether/ethyl acetate: 40/6-70%) to obtain compound 14-A.

MS-ESI m/z: 306.9 [M+H]$^+$.

Step 2: Synthesis of Compound 14

Compound 1-B (230 mg, 749.70 μmol) was placed in a microwave reactor, and 1,4-dioxane (3 mL) and water (0.3 mL) were added thereto. Intermediate I (504.22 mg, 1.5 mmol), sodium carbonate (198.65 mg, 1.87 mmol) and [1,1-bis(diphenylphosphino)ferrocene]dichloropalladium dichloromethane complex (61.22 mg, 74.97 μmol) were added thereto. The mixture was bubbled with nitrogen for 2 minutes, heated to 110° C. and stirred for 1 hour under microwave irradiation. After the reaction solution was cooled, tetraethylammonium fluoride hydrate (188.10 mg, 1.12 mmol) was added to the reaction solution, and the mixture was stirred at 25° C. for 2 hours. The reaction system was diluted with water (20 mL), washed with ethyl acetate (15 mL×3), washed with saturated brine (10 mL), and dried over anhydrous sodium sulfate. After filtering off the desiccant, the solvent was removed under reduced pressure to obtain a crude product. The crude product was separated by column chromatography (tetrahydrofuran/petroleum ether: 50-70%) to obtain compound 14.

MS m/z: 407.1 [M+H]$^+$.

$^1$H NMR (400 MHz, DMSO-d$_6$) δ 11.81 (br s, 1H), 8.39 (s, 1H), 7.78 (t, J=2.8 Hz, 1H), 7.38 (s, 1H), 7.05 (d, J=2.3 Hz, 1H), 6.84 (br s, 1H), 6.78 (s, 1H), 4.44 (br d, J=6.5 Hz, 1H), 4.06 (br d, J=12.0 Hz, 1H), 3.97 (br dd, J=3.0, 11.0 Hz, 1H), 3.83 (s, 3H), 3.78-3.72 (m, 1H), 3.71-3.65 (m, 1H), 3.53 (dt, J=2.8, 11.8 Hz, 1H), 3.17 (dt, J=3.6, 12.7 Hz, 1H), 2.07 (s, 3H), 1.22 (d, J=6.5 Hz, 3H).

Embodiment 15

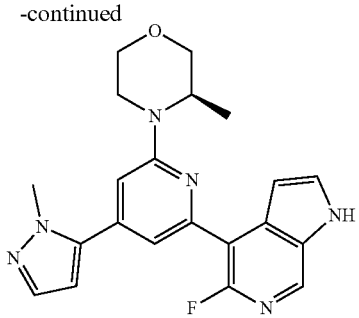

15

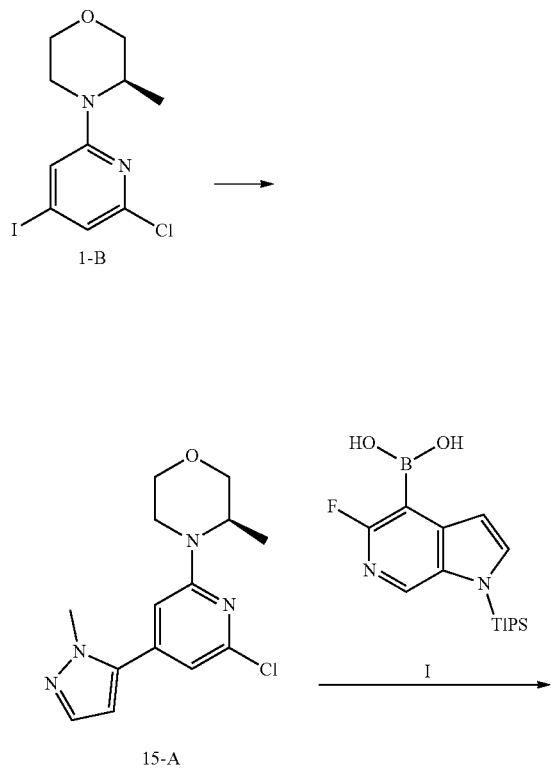

Step 1: Synthesis of Compound 15-A

[1,1-Bis(diphenylphosphino)ferrocene]dichloropalladium (64.83 mg, 88.61 μmol, 0.1 eq) was added to a solution of compound 1-B (300 mg, 886.08 μmol, 1 eq), intermediate I (202.80 mg, 974.68 μmol, 1.1 eq), sodium carbonate (140.87 mg, 1.33 mmol, 664.56 μL, 1.5 eq) in 1,4-dioxane (3 mL), bubbled with nitrogen, and the reaction was stirred at 100° C. for 1 hour under microwave irradiation. After the reaction solution was cooled, the reaction system was diluted with water (20 mL), washed with ethyl acetate (20 mL×3), washed with saturated brine (10 mL), and dried over anhydrous sodium sulfate. After filtering off the desiccant, the solvent was removed under reduced pressure to obtain a crude product. The crude product was purified by column chromatography (petroleum ether/ethyl acetate: 40%-50%) to obtain compound 15-A.

MS-ESI m/z: 292.9 [M+H]$^+$.

Step 2: Synthesis of Compound 15

Compound 15-A (150 mg, 512.36 μmol) was placed in a microwave reactor, and 1,4-dioxane (3 mL) and water (0.3 mL) were added thereto. Intermediate I (172.30 mg, 512.36 μmol), sodium carbonate (135.76 mg, 1.28 mmol) and [1,1-bis(diphenylphosphino)ferrocene]dichloropalladium dichloromethane complex (41.84 mg, 51.24 μmol) were added thereto. The mixture was bubbled with nitrogen for 2 minutes, heated to 110° C. and stirred for 1 hour under microwave irradiation. After the reaction solution was cooled, tetraethylammonium fluoride hydrate (128.55 mg, 768.54 μmol) was added to the reaction solution, and the mixture was stirred at 25° C. for 2 hours. The reaction system was diluted with water (20 mL), washed with ethyl acetate (15 mL×3), washed with saturated brine (10 mL), and dried over anhydrous sodium sulfate. After filtering off the desiccant, the solvent was removed under reduced pressure to obtain a crude product. The crude product was separated by column chromatography (ethyl acetate/dichloromethane: 50-60%) to obtain compound 15.

MS m/z: 393.1 [M+H]$^+$.

$^1$H NMR (400 MHz, DMSO-d$_6$) δ 11.80 (br s, 1H), 8.39 (s, 1H), 7.78 (t, J=2.8 Hz, 1H), 7.53 (d, J=2.0 Hz, 1H), 7.17 (d, J=2.0 Hz, 1H), 6.87 (s, 1H), 6.82 (br s, 1H), 6.60 (d, J=1.8 Hz, 1H), 4.49 (br d, J=6.5 Hz, 1H), 4.08-3.99 (m, 2H), 3.97 (s, 3H), 3.80-3.73 (m, 1H), 3.72-3.64 (m, 1H), 3.53 (dt, J=2.6, 11.6 Hz, 1H), 3.18 (dt, J=3.5, 12.7 Hz, 1H), 1.22 (d, J=6.5 Hz, 3H).

Embodiment 16

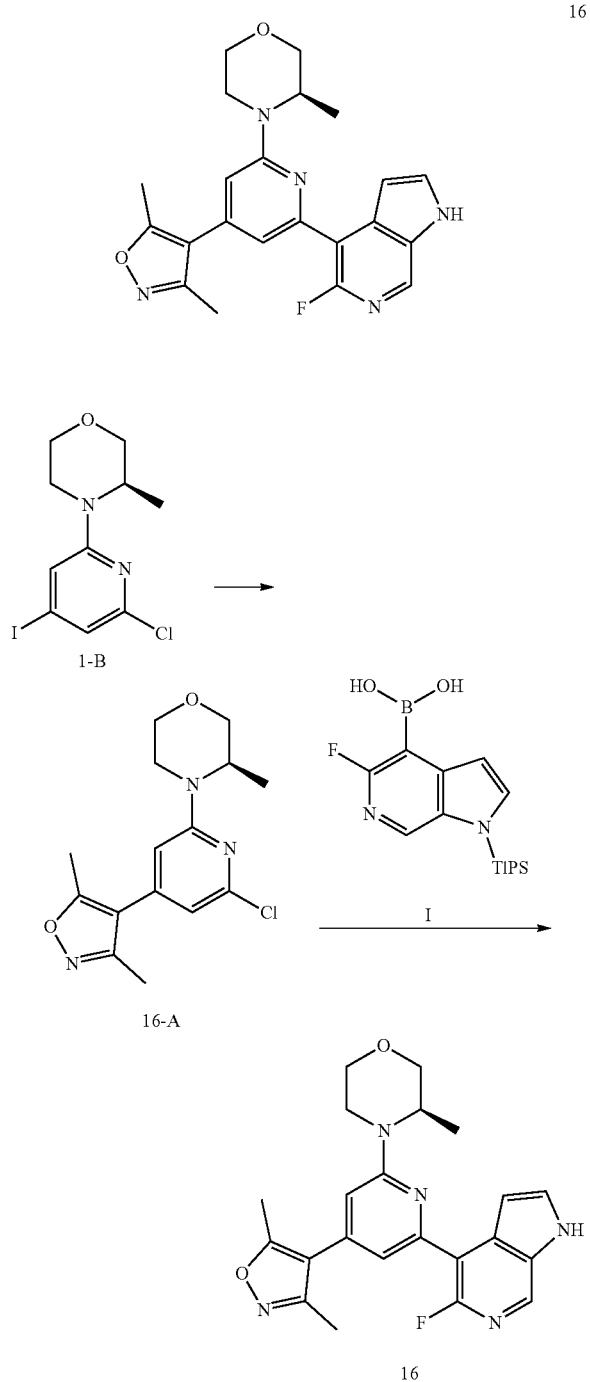

Step 1: Synthesis of Compound 1-B

[1,1-Bis(diphenylphosphino)ferrocene]dichloropalladium (108.06 mg, 147.68 μmol, 0.1 eq) was added to a solution of compound 1-B (500 mg, 1.48 mmol, 1 eq), 3,5-dimethylisoxazole-4-boronic acid, pinacol ester (362.38 mg, 1.62 mmol, 1.1 eq), sodium carbonate (234.79 mg, 2.22 mmol, 1.11 mL, 1.5 eq) in 1,4-dioxane (8 mL). The system was replaced with nitrogen for 3 times, and the reaction was stirred at 90° C. for 12 hours. After the reaction solution was cooled, the reaction system was diluted with water (40 mL), washed with ethyl acetate (20 mL×3), washed with saturated brine (10 mL), and dried over anhydrous sodium sulfate. After filtering off the desiccant, the solvent was removed under reduced pressure to obtain a crude product. The crude product was purified by column chromatography (petroleum ether/ethyl acetate: 0%-20%) to obtain compound 16-A.

MS-ESI m/z: 307.9 [M+H]$^+$.

Step 2: Synthesis of Compound 16

Compound 16-A (370 mg, 1.2 mmol) was placed in a microwave reactor, and 1,4-dioxane (5 mL) and water (0.5 mL) were added thereto. Intermediate I (727.69 mg, 2.16 mmol), sodium carbonate (318.54 mg, 3.01 mmol) and [1,1-bis(diphenylphosphino)ferrocene]dichloropalladium dichloromethane complex (98.17 mg, 120.22 μmol) were added thereto, the system was replaced with nitrogen for 3 times, and the mixture was stirred at 80° C. for 12 hours. After the reaction solution was cooled, tetraethylammonium fluoride hydrate (301.62 mg, 1.80 mmol) was added to the reaction solution, and the mixture was stirred at 25° C. for 2 hours. The reaction system was diluted with water (40 mL), washed with ethyl acetate (15 mL×3), washed with saturated brine (10 mL), and dried over anhydrous sodium sulfate. After filtering off the desiccant, the solvent was removed under reduced pressure to obtain a crude product. The crude product was separated by column chromatography (ethyl acetate/petroleum ether: 50-75%) to obtain compound 16.

MS m/z: 408.1 [M+H]$^+$.

$^1$H NMR (400 MHz, CHLOROFORM-d) δ 9.18 (br s, 1H), 8.37 (s, 1H), 7.53 (t, J=2.6 Hz, 1H), 7.11 (d, J=2.5 Hz, 1H), 7.07 (br s, 1H), 6.43 (s, 1H), 4.38 (br d, J=6.8 Hz, 1H), 4.10-3.97 (m, 2H), 3.88-3.74 (m, 2H), 3.67 (dt, J=3.0, 11.8 Hz, 1H), 3.32 (dt, J=3.6, 12.6 Hz, 1H), 2.51 (s, 3H), 2.37 (s, 3H), 1.35 (d, J=6.8 Hz, 3H).

Experimental Embodiment 1: In Vitro Cell Activity Experiment

The inhibitory activity of the test compounds against human ATR kinase was evaluated by measuring IC$_{50}$ value.

ATR/ATRIP (h) was incubated in detection buffer containing 50 nM GST-cMyc-p53 and Mg/ATP (10 μM). The reaction was initiated by adding Mg/ATP mixture. After incubation at room temperature for 30 minutes, the reaction was terminated by adding a termination solution containing EDTA. Finally, a detection buffer containing d$^2$-labeled anti-GST monoclonal antibody and europium-labeled anti-phospho-Ser15 antibody against phosphorylated p53 were added. Plates were then read in time-resolved fluorescence mode for homogeneous time resolution.

The fluorescence (HTRF) signal was determined according to the formula HTRF=10000×(Em665 nm/Em620 nm).

TABLE 1

Experimental results of ATR enzyme activity in vitro

| Compound No. | IC$_{50}$(nM) |
|---|---|
| Compound 1 | 33 |
| Compound 2 | 69 |
| Compound 5 | 336 |
| Compound 6 | 211 |
| Compound 7 | 78 |
| Compound 8 | 425 |
| Compound 9 | 31 |
| Compound 10 | 182 |

TABLE 1-continued

Experimental results of ATR enzyme activity in vitro

| Compound No. | $IC_{50}$ (nM) |
|---|---|
| Compound 13 | 500 |
| Compound 14 | 57 |
| Compound 15 | 204 |
| Compound 16 | 78 |

The experimental results show that the compounds of the present disclosure have strong inhibitory activity against ATR enzyme.

Experimental Embodiment 2: In Vitro Cell Activity Experiment

In this experiment, the inhibitory effect of the compounds on cell proliferation was studied by detecting the effect of the compounds on the in vitro cell activity in the tumor cell line LoVo.

CellTiter-Glo Luminescent Cell Viability Assay

The following steps were carried out according to the instructions of PromegaCellTiter-Glo luminescent cell viability assay kit (Promega-G7573).

(1) CellTiter-Glo buffer was thawed and placed at room temperature.

(2) CellTiter-Glo substrate was placed at room temperature.

(3) CellTiter-Glo working solution was prepared by adding CellTiter-Glo buffer to a vial of CellTiter-Glo substrate to dissolve the substrate.

(4) Slowly vortexed to fully dissolve.

(5) The cell culture plate was taken out and left it for 30 minutes to equilibrate to room temperature.

(6) 50 μL (equal to half the volume of cell culture medium in each well) of CellTiter-Glo working solution was added to each well. The cell plate was wrapped in aluminum foil to protect from light.

(7) The culture plate was shaken on an orbital shaker for 2 minutes to induce cell lysis.

(8) The culture plate was left at room temperature for 10 minutes to stabilize the luminescence signal.

(9) The luminescence signal was detected on the SpectraMax i3x of Molecular Devices plate reader.

Data Analysis

The Inhibition rate (IR) of the test compound was calculated using the following formula: IR (%)=(1−(RLU compound−RLU blank control)/(RLU solvent control−RLU blank control))*100%. The inhibition rates of different concentrations of the compounds were calculated in Excel, and then the inhibition curves were made by GraphPad Prism software and the related parameters were calculated, including the minimum inhibition rate, the maximum inhibition rate and $IC_{50}$.

Experimental results are shown in Table 2:

TABLE 2

Experimental results of in vitro LoVo cell proliferation inhibition

| Compound No. | LoVo cell proliferation $IC_{50}$ (μM) |
|---|---|
| Compound 1 | 0.102 |
| Compound 2 | 0.234 |

The experimental results show that the compounds of the present disclosure have a good inhibitory effect on LoVo tumor cells lacking the ATM signaling pathway.

Experimental Embodiment 3: Study on In Vivo Pharmacokinetic Properties

Test sample: On the basis of the above experiments, compound 1 was selected for further experiments.

Experimental methods: The purpose of this study was to determine the pharmacokinetic parameters of compound 1 and to calculate its oral bioavailability in female Balb/c Nude mice. This project used 4 female Balb/c Nude mice. Two mice were administered intravenously at a dose of 1 mg/kg, and plasma samples were collected at 0 hours (before administration) and 0.0833, 0.25, 0.5, 1, 2, 4, 6, 8, 24 hours after administration. The other two mice were administered orally by gavage at a dose of 10 mg/kg or 25 mg/kg, and plasma samples were collected at 0 hours (before administration) and 0.25, 0.5, 1, 2, 4, 6, 8, 24 hours after administration. The collected samples were then analyzed by LC/MS/MS and data were collected. The collected analysis data were used to calculate the relevant pharmacokinetic parameters by Phoenix WinNonlin 6.2.1 software.

Experimental results are shown in Table 3:

TABLE 3

Results of in vivo pharmacokinetic experiments 3.1 Results of intravenous administration

| $C_0$ (nM) | Cl (mL/min/kg) | $V_{dss}$ (L/kg) | $T_{1/2}$ (h) | $AUC_{0-t}$ (nM · h) |
|---|---|---|---|---|
| 2804 | 15.8 | 1.65 | 1.32 | 2549 |

3.2 Results of oral administration

| Administration dosage (mg/kg) | $C_{max}$ (nM) | $T_{1/2}$ (h) | $AUC_{0-t}$ (nM · h) | F (%) |
|---|---|---|---|---|
| 10 | 9565 | 1.4 | 22992 | 91.6 |
| 25 | 17396 | 3.8 | 82019 | — |

Note:

$C_0$ (nM) is the drug concentration in vivo at 0 minutes; Cl (mL/min/kg) is the drug clearance rate in vivo; $V_{dss}$ (L/kg) is the volume of drug distribution in vivo; $T_{1/2}$ (h) is the half-life; $AUC_{0-t}$ (nM · h) is the drug exposure in vivo; $C_{max}$ (nM) is the maximum drug concentration in vivo.

Experimental conclusion: The compound of the present disclosure has good in vivo pharmacokinetic properties such as exposure and bioavailability.

Experimental Embodiment 4: In Vivo Efficacy Study of Human Gastric Cancer Cell SNU-601 CDX Experimental Objective:

The main objective of this study was to study the antitumor efficacy of the test sample on the xenograft tumor model of human gastric cancer cell SNU-601.

Experimental Methods:

1. Laboratory Animals

Species: mice

Strain: CB17 SCID mice

Supplier: Huafukang Laboratory Animal Technology Co., Ltd.

Week age: 6-8 weeks old

Gender: female

2. Cell Culture

Human gastric cancer SNU-601 cells, sourced from KCLB (Cat. No.: 00601), were maintained and passaged by HD Biosciences (Shanghai) Co., Ltd. In vitro culture conditions were RPMI 1640 culture medium (containing 300 mg/L L-glutamine) with 10% fetal bovine serum, 25 mM HEPES and 25 mM sodium bicarbonate, incubated in 5% $CO_2$ incubator at 37° C., and passaged for two or three times a week. When the number of cells reached the requirement, the cells were collected and counted. 0.2 mL ($5 \times 10^6$ cells) SNU-601 cells (resuspended in DPBS:Matrigel=1:1) were subcutaneously inoculated into the right back of each mouse, and the group administration was started when the average tumor volume reached 147.61 $mm^3$.

3. Administration Dosage of Test Sample

Administration dosage: Compound 1 was orally administered at three doses of 15 mg/kg (administered for 3 days without administration for 4 days), 10 mg/kg (administered for 3 days without administration for 4 days) and 5 mg/kg (continuous administration).

4. Tumor Measurements and Experimental Indexes

Tumor diameters were measured with vernier calipers three times a week. The tumor volume was calculated by the formula: $V=0.5 \times a \times b^2$, wherein a and b referred to the long and short diameter of the tumor, respectively. The calculation formula of relative tumor volume (RTV) was: RTV (%)=(Vt/V1)×100; the calculation formula of animal body weight change (BWC) was: BWC (%)=(BWt−BW1)/BW1×100, wherein V1 and BW1 referred to the tumor volume and body weight of a certain animal on the day of group administration, and Vt and BWt referred to the tumor volume and body weight of a certain animal at a certain measurement.

The antitumor efficacy of the compounds was evaluated by TGI (%) or relative tumor proliferation rate T/C (%). Relative tumor proliferation rate T/C (%)=TRTV/CRTV×100 (TRTV: mean RTV of the treatment group; CRTV: mean RTV of the negative control group). The relative tumor volume (RTV) was calculated according to the results of tumor measurement, and the calculation formula was RTV=Vt/V1, wherein V1 was the tumor volume measured at the time of group administration (that is, D1), Vt was the tumor volume at a certain measurement, and the data of TRTV and CRTV were taken on the same day.

TGI (%) reflected the tumor growth inhibition rate. TGI (%)=[(1−(average tumor volume at the end of administration of a certain treatment group−average tumor volume at the beginning of administration of this treatment group))/(average tumor volume at the end of treatment in the solvent control group−average tumor volume at the beginning of treatment in the solvent control group)]×100.

After the experiment, the tumor weight would be detected, and the percentage of Tweight/Cweight would be calculated. Tweight and Cweight referred to the tumor weight of the administration group and the solvent control group, respectively.

5. Experimental Results

In this experiment, the xenograft tumor model of human gastric cancer cell SNU601 was used to evaluate the in vivo efficacy of the test compounds. During the whole administration period, no animals were discontinued due to body weight loss of more than 10%, and the efficacy test was terminated on the 21st day after administration.

On the 21st day after administration, the tumor volume of the solvent group reached 890.01±184.62 $mm^3$. Compared with the solvent control group, compound 1 showed a certain anti-tumor effect at the doses of 15 mg/kg, 10 mg/kg and 5 mg/kg. Their corresponding tumor volumes were 108.74±9.67 $mm^3$, 136.74±14.46 $mm^3$ and 229.99±24.42 $mm^3$, respectively, and their tumor inhibition rates TGI were 104.81% (p<0.01), 101.08% (P<0.01) and 88.61% (p<0.01).

During the whole experimental period, the body weight of the animals in the compound 1 administration group did not decrease significantly, and the animal state had no abnormality.

In conclusion, the compounds of the present disclosure can significantly inhibit the growth of human gastric cancer SNU-601 xenograft tumor, and are relatively tolerant to mice.

What is claimed is:

1. A compound represented by formula (II) or a pharmaceutically acceptable salt thereof,

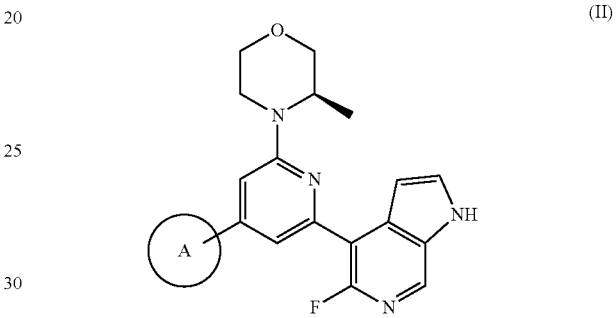

wherein,
ring A is

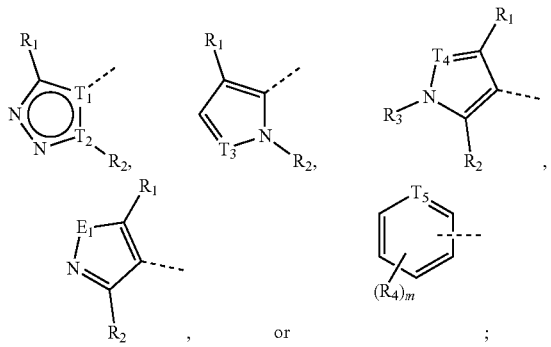

$T_1$, $T_2$, $T_3$, $T_4$ and $T_5$ are each independently C, CH or N;
$E_1$ is O or S;
$R_1$ is each independently H or $C_{1-3}$ alkyl, wherein the $C_{1-3}$ alkyl is optionally substituted with 1, 2 or 3 $R_a$;
$R_2$ is each independently H or $C_{1-3}$ alkyl, wherein the $C_{1-3}$ alkyl is optionally substituted with 1, 2 or 3 $R_b$;
$R_3$ is H or $C_{1-3}$ alkyl;
$R_4$ is each independently H, $C_{1-3}$ alkyl, —O—$C_{1-3}$ alkyl or —S(O)$_2$—$C_{1-3}$ alkyl, wherein the $C_{1-3}$ alkyl, —O—$C_{1-3}$ alkyl and —S(O)$_2$—$C_{1-3}$ alkyl are each independently optionally substituted with 1, 2 or 3 $R_c$;
$R_a$, $R_b$ and $R_c$ are each independently F, Cl, Br or I;
m is 1, 2 or 3.

2. The compound according to claim 1 or the pharmaceutically acceptable salt thereof, wherein the compound has the structure of formula (I-1) or (I-2)

(I-1)

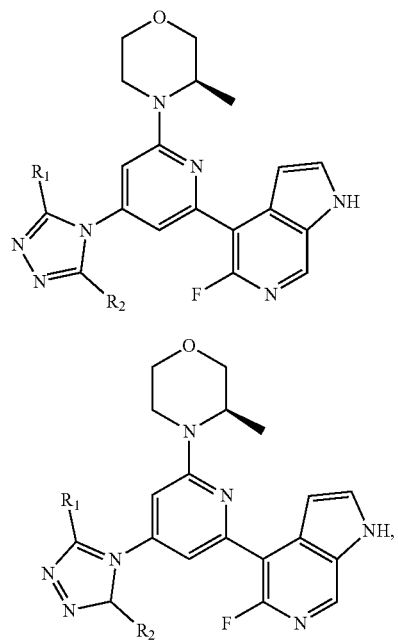

(I-2)

wherein,
R₁ and R₂ are as defined above.

3. The compound according to claim 1 or the pharmaceutically acceptable salt thereof, wherein R₁ is each independently H or CH₃, wherein the CH₃ is optionally substituted with 1, 2 or 3 $R_a$.

4. The compound according to claim 3 or the pharmaceutically acceptable salt thereof, wherein R₁ is each independently H or CH₃.

5. The compound according to claim 1 or the pharmaceutically acceptable salt thereof, wherein R₂ is each independently H or CH₃, wherein the CH₃ is optionally substituted with 1, 2 or 3 $R_b$.

6. The compound according to claim 5 or the pharmaceutically acceptable salt thereof, wherein R₂ is each independently H or CH₃.

7. The compound according to claim 1 or the pharmaceutically acceptable salt thereof, wherein R₃ is each independently H or CH₃.

8. The compound according to claim 1 or the pharmaceutically acceptable salt thereof, wherein R₄ is each independently H, CH₃, —O—CH₃ or —S(O)₂—CH₃.

9. The compound according to claim 1 or the pharmaceutically acceptable salt thereof, wherein ring A is

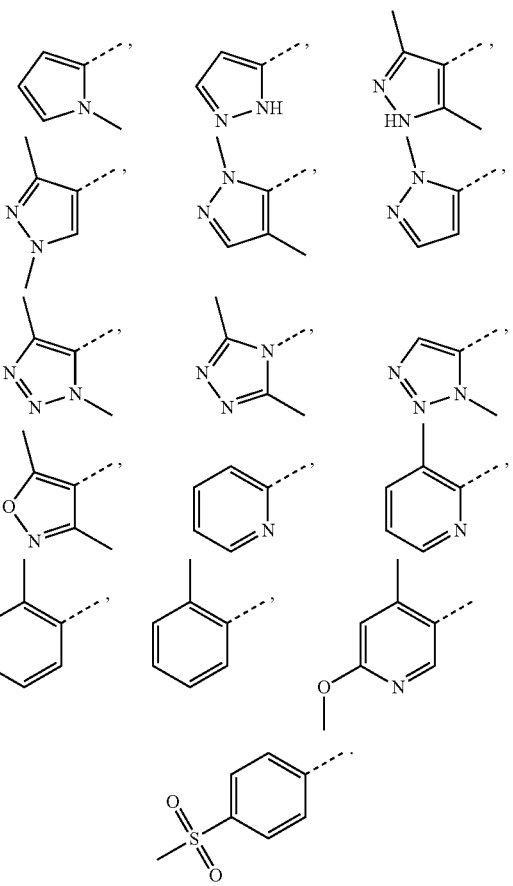

10. The compound according to claim 9 or the pharmaceutically acceptable salt thereof, wherein ring A is 11. A compound represented by the following formula or a pharmaceutically acceptable salt thereof, and the compound is

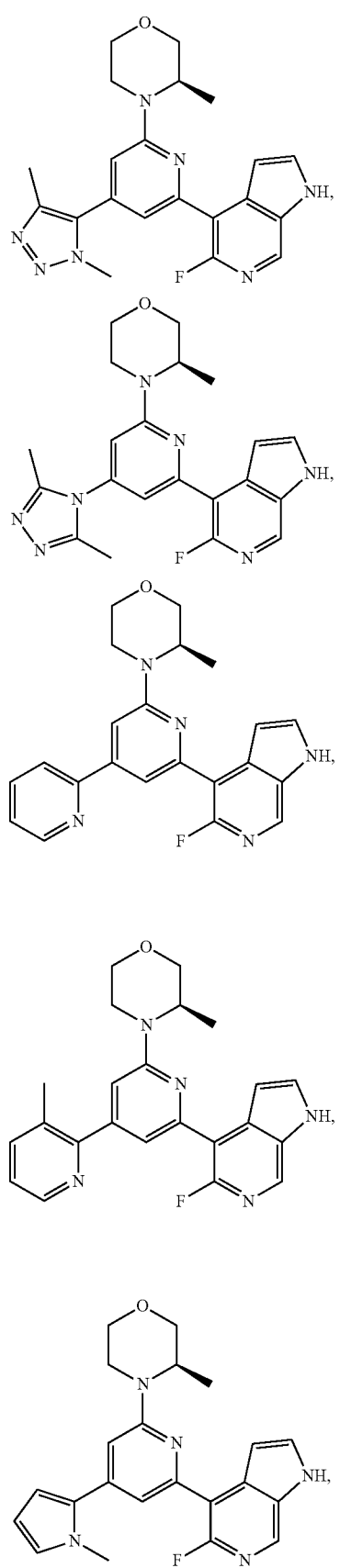
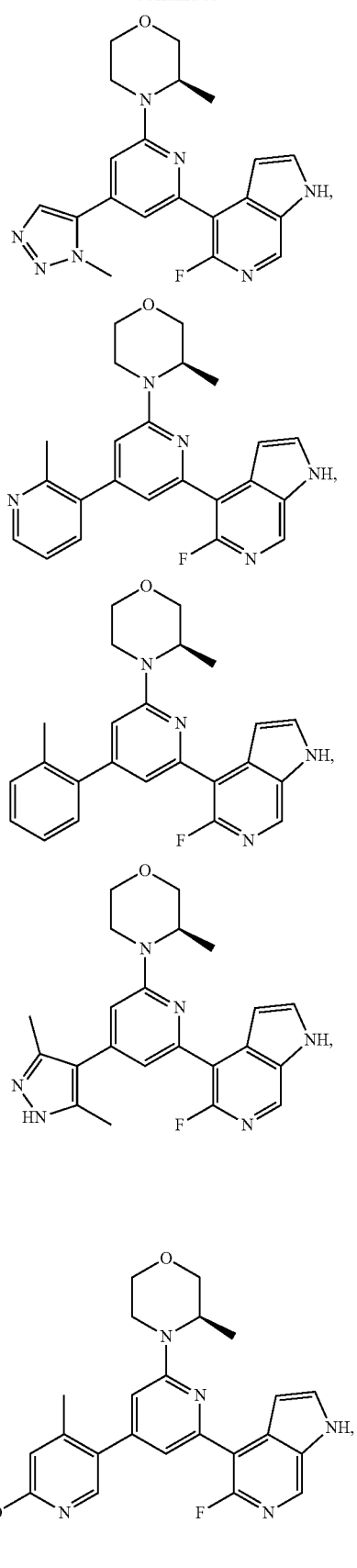

-continued
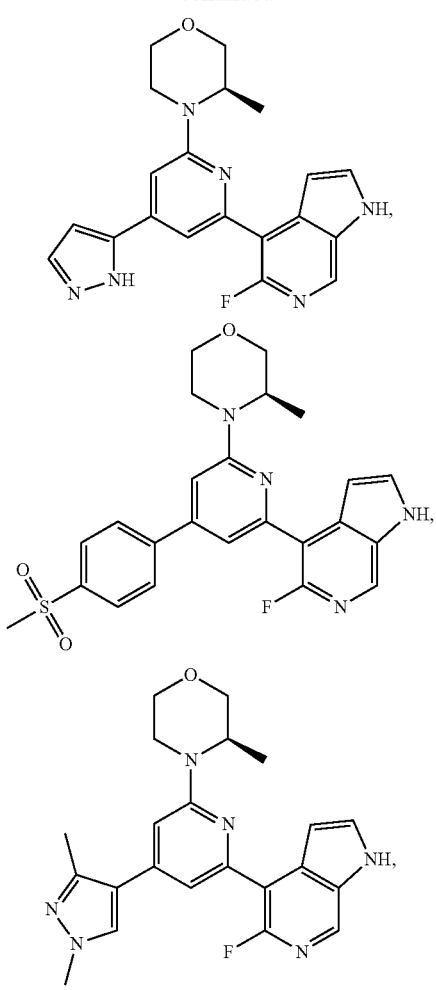
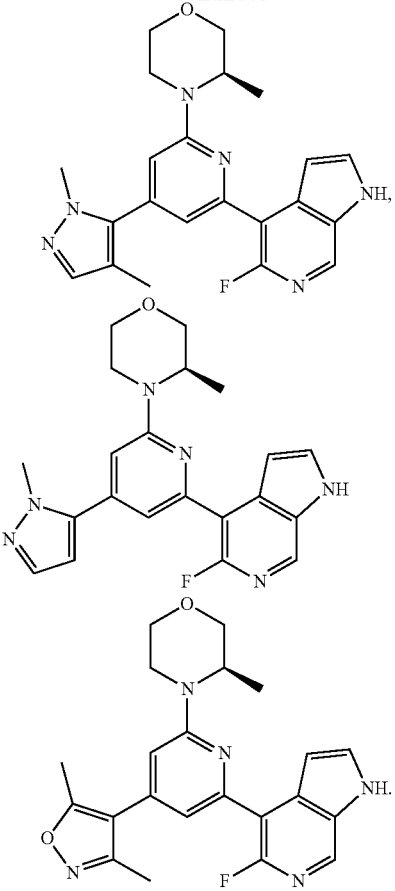
12. A method for inhibiting ATR in a subject in need thereof, comprising: administering an effective amount of the compound according to claim 1 or the pharmaceutically acceptable salt thereof to the subject.
\* \* \* \* \*